United States Patent
Vladyslav et al.

(10) Patent No.: US 10,825,133 B2
(45) Date of Patent: Nov. 3, 2020

(54) METHOD AND APPARATUS FOR PROCESSING IMAGE

(71) Applicant: SAMSUNG ELECTRONICS CO., LTD., Suwon-si (KR)

(72) Inventors: Zakharchenko Vladyslav, Seongnam-si (KR); Kwang-pyo Choi, Gwacheon-si (KR); Jeong-hoon Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 117 days.

(21) Appl. No.: 16/089,224

(22) PCT Filed: May 18, 2016

(86) PCT No.: PCT/KR2016/005289
§ 371 (c)(1),
(2) Date: Sep. 27, 2018

(87) PCT Pub. No.: WO2017/175910
PCT Pub. Date: Oct. 12, 2017

(65) Prior Publication Data
US 2019/0108612 A1    Apr. 11, 2019

(30) Foreign Application Priority Data

Apr. 5, 2016  (WO) ................ PCT/KR2016/003537

(51) Int. Cl.
*G06K 9/32*    (2006.01)
*G06T 3/00*    (2006.01)
(Continued)

(52) U.S. Cl.
CPC .............. *G06T 3/0062* (2013.01); *G06T 3/00* (2013.01); *G06T 7/60* (2013.01); *G06T 11/40* (2013.01)

(58) Field of Classification Search
CPC ........... G06T 3/0062; G06T 3/00; G06T 7/60; G06T 11/40; G06T 3/0093; G06T 5/006; G06K 2009/363; H04N 5/2628
See application file for complete search history.

(56) References Cited

U.S. PATENT DOCUMENTS

| 2,424,601 A | 7/1947 | Crouch |
| 7,483,588 B2 | 1/2009 | Park |

(Continued)

FOREIGN PATENT DOCUMENTS

| KR | 10-0732958 A | 6/2007 |
| KR | 10-1120131 B1 | 3/2012 |

(Continued)

OTHER PUBLICATIONS

Shigang Li et al. "A Full-View Spherical Image Format", 2010 International Conference on Pattern Recognition, IEEE, Aug. 23-26, 2010 (pp. 2337-2340).

(Continued)

*Primary Examiner* — Duy M Dang
(74) *Attorney, Agent, or Firm* — Sughrue Mion, PLLC

(57) ABSTRACT

Provided is an image processing method including: acquiring images captured in at least two directions; generating a projection image by projecting the images onto a polyhedron; moving a location of at least one pixel among pixels in the projection image to reshape the projection image into a rectangular image; and processing the rectangular image.

7 Claims, 34 Drawing Sheets

(51) Int. Cl.
*G06T 11/40* (2006.01)
*G06T 7/60* (2017.01)

(56) References Cited

U.S. PATENT DOCUMENTS

| | | | |
|---|---|---|---|
| 7,936,374 | B2 | 5/2011 | Cutler |
| 9,888,173 | B2 | 2/2018 | Zhang et al. |
| 2001/0010555 | A1* | 8/2001 | Driscoll, Jr. ........... G02B 13/06 |
| | | | 348/335 |
| 2011/0310219 | A1 | 12/2011 | Kim et al. |
| 2013/0044258 | A1 | 2/2013 | Dennis |
| 2013/0106840 | A1* | 5/2013 | Lee .................. G06T 15/04 |
| | | | 345/419 |
| 2014/0132598 | A1* | 5/2014 | Narukawa ............... G06T 17/20 |
| | | | 345/419 |
| 2015/0363976 | A1 | 12/2015 | Henson |
| 2016/0012855 | A1 | 1/2016 | Krishnan |

FOREIGN PATENT DOCUMENTS

| | | |
|---|---|---|
| KR | 10-1201107 B1 | 11/2012 |
| KR | 10-2015-0091517 A | 8/2015 |

OTHER PUBLICATIONS

Communication dated Feb. 18, 2019, issued by the European Patent Office in counterpart European Application No. 16898014.2.
International Search Report and Written Opinion (PCT/ISA/210 and PCT/ISA/237), dated Dec. 15, 2016 by International Searching Authority in International Application No. PCT/KR2016/005289.

* cited by examiner

FIG. 24
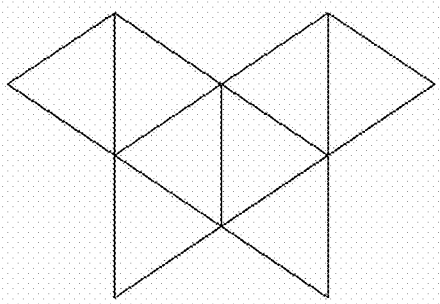
(a)
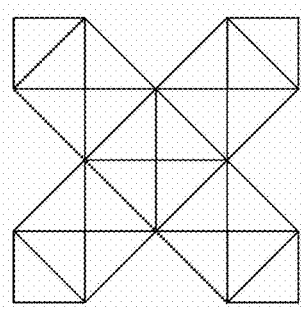
(b)
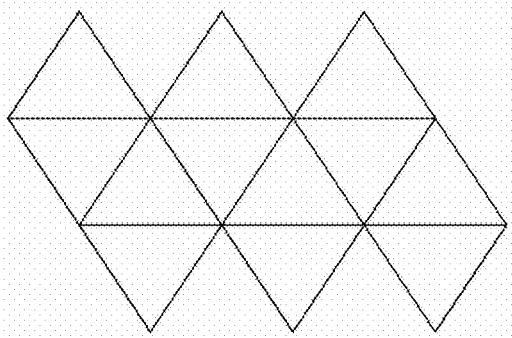
(c)
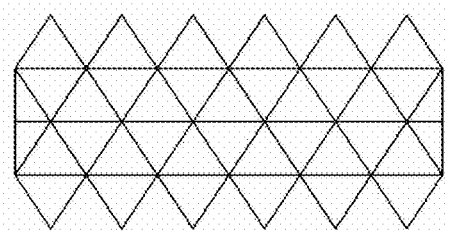
(d)

METHOD AND APPARATUS FOR PROCESSING IMAGE

TECHNICAL FIELD

The present disclosure relates to a method and an apparatus for processing a virtual image.

BACKGROUND ART

Along with the recent development of virtual reality (VR)-related techniques and devices, VR devices using the same have been on the spotlight. These VR devices are widely applied to various fields such as entertainment, education, office work, and medical treatment.

A VR image displayed on a VR device moves according to a gaze of a user wearing a VR display device, and thus, the VR image is supposed to include all peripheral images around the user. That is, a VR image provided from a VR device is an image corresponding to all directions around a user, that is, a 360-degree image. Therefore, an interest in processing of such a 360-degree image together with an interest in a VR device has increased.

A method of processing a 360-degree image according to the related art processes a large-sized image, and thus, processing efficiency is low, power consumption is high, and a portion of the image may be lost, thereby decreasing quality. Therefore, a relatively efficient image processing method and apparatus capable of providing a high-quality image are required.

DESCRIPTION OF EMBODIMENTS

Solution to Problem

Provided are a method and an apparatus for processing an image. More particularly, provided are a relatively efficient image processing method and apparatus capable of providing a high-quality image.

Advantageous Effects of Disclosure

According to an embodiment, a high-quality 360-degree image may be efficiently provided.

BRIEF DESCRIPTION OF DRAWINGS

FIG. 24 illustrates projection images according to an embodiment.

BEST MODE

Figure 1:
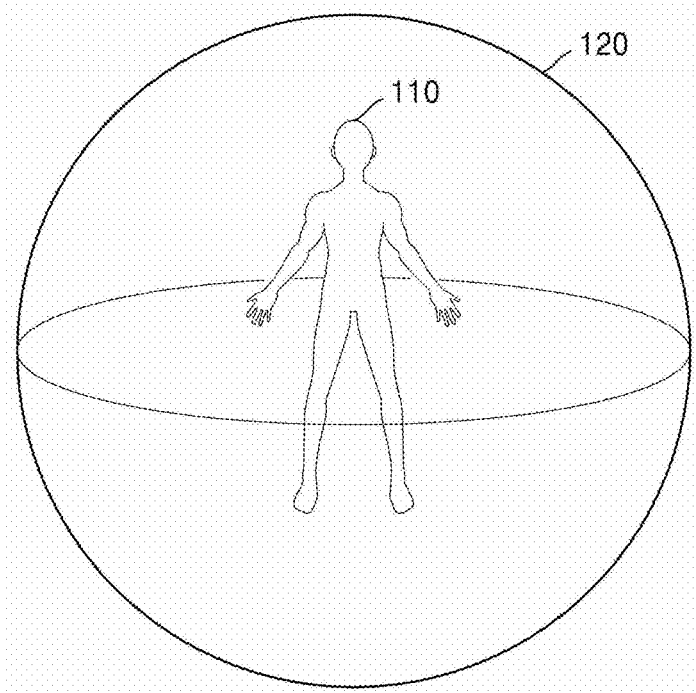
FIG. 1 illustrates a 360-degree image.

According to an aspect of the present disclosure, an image processing method includes: acquiring images captured in at least two directions; generating a projection image by projecting the images onto a polyhedron; moving a location of at least one pixel among pixels in the projection image to reshape the projection image into a rectangular image; and processing the rectangular image.

According to another aspect of the present disclosure, an image processing method includes: acquiring a rectangular image; moving a location of at least one pixel among pixels in the rectangular image to restore a projection image; and assembling the projection image into a polyhedron and back-projecting the polyhedron to generate a back-projection image.

According to another aspect of the present disclosure, an image processing apparatus includes: a controller configured to control images captured in at least two directions to be acquired, a projection image to be generated by projecting the images onto a polyhedron, a rectangular image to be reshaped by moving a location of at least one pixel among pixels in the projection image, and the rectangular image to be processed; and a memory which stores data for an operation of the controller.

Mode of Disclosure

Advantages and features of the disclosure and a method for achieving them will be clear with reference to the accompanying drawings, in which embodiments are shown. The disclosure may, however, be embodied in many different forms and should not be construed as being limited to the embodiments set forth herein; rather, these embodiments are provided so that this disclosure will be thorough and complete, and will fully convey the concept of the disclosure to those of ordinary skill in the art, and the disclosure is only defined by the scope of the claims. Like reference numerals denote like elements throughout the specification.

Throughout the specification, when it is described that a certain part is "connected" to another part, it will be understood that the certain part may be connected to another element "directly" or "electrically" via another element in the middle. In addition, throughout the specification, it will also be understood that when a component "includes" an element, unless there is another opposite description thereto, it should be understood that the component does not exclude another element but may further include another element. The term ' . . . unit' used in the specification indicates a component including software or hardware, such as a Field Programmable Gate Array (FPGA) or an Application-Specific Integrated Circuit (ASIC), and the ' . . . unit' performs certain roles. However, the ' . . . unit' is not limited to software or hardware. The ' . . . unit' may be configured to be included in an addressable storage medium or to reproduce one or more processors. Therefore, for example, the ' . . . unit' includes components, such as software components, object-oriented software components, class components, and task components, processes, functions, attributes, procedures, subroutines, segments of program code, drivers, firmware, microcode, circuits, data, a database, data structures, tables, arrays, and variables. A function provided inside components and ' . . . units' may be combined into a smaller number of components and ' . . . units' or be further divided into additional components and ' . . . units'.

Hereinafter, embodiments of the present disclosure will be described in detail with reference to the accompanying drawings so that those of ordinary skill in the art may easily realize the present disclosure. However, the present disclosure may be embodied in many different forms and should not be construed as being limited to the embodiments set forth herein. In the drawings, parts irrelevant to the description are omitted to clearly describe the present disclosure.

The terms used in the disclosure are those general terms currently widely used in the art, but the terms may vary according to the intention of those of ordinary skill in the art, precedents, or new technology in the art. Also, specified terms may be selected by the applicant, and in this case, the detailed meaning thereof will be described in the detailed description. Thus, the terms used in the disclosure should be understood not as simple names but based on the meaning of the terms and the overall description.

FIG. 1 illustrates a 360-degree image.

As shown in FIG. 1, the 360-degree image is an image 120 indicating a peripheral environment surrounding a specific location by 360° around the specific location 110. When a user wears a virtual reality (VR) device, an image indicating a peripheral image surrounding the user by 360° in VR may be a 360-degree image. The VR device may provide the 360-degree image to the user such that even when the user wearing the VR device moves or averts the user's eyes in the VR, the VR device provides an appropriate image according to the motion of the user.

Figure 2:
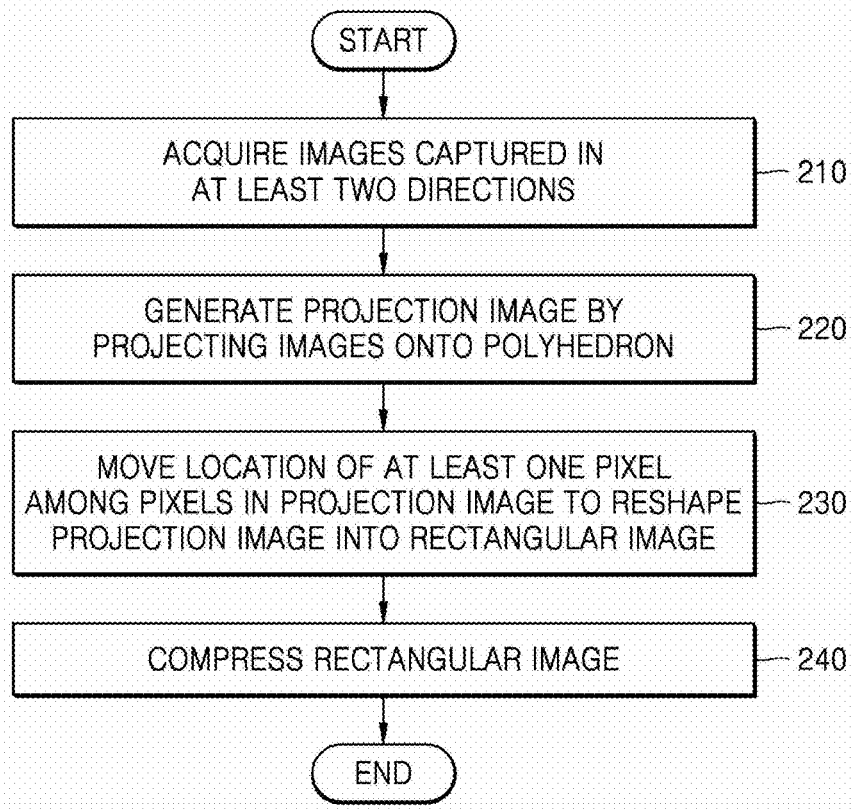
FIG. 2 is a flowchart of an image processing method according to an embodiment.

FIG. 2 is a flowchart of an image processing method according to an embodiment.

Referring to FIG. 2, first, in operation 210, an image processing apparatus acquires images captured in at least two directions. According to an embodiment, the image processing apparatus may acquire images captured in at least two directions by photographing a peripheral environment surrounding the image processing apparatus through a camera. In this case, the image processing apparatus may photograph the peripheral environment surrounding the image processing apparatus through at least one camera. According to an embodiment, the camera may be a component included in the image processing apparatus or be configured as a device separated from the image processing apparatus. In addition, the image processing apparatus may photograph the peripheral environment in a panoramic manner or in directions such as front, rear, left, right, up, and down directions.

In addition, according to an embodiment, the image processing apparatus may acquire images captured in at least two directions by receiving images from an external device. That is, the external device may photograph the peripheral environment or generate virtual images and transmit images to the image processing apparatus, and the image processing apparatus may acquire images captured in at least two directions by receiving the images.

Thereafter, in operation 220, the image processing apparatus generates a projection image by projecting the images onto a polyhedron. According to an embodiment, when the projection image is generated, the image processing apparatus may project the images on an area of a development view corresponding to an area of the polyhedron when the images are projected on the polyhedron. According to another embodiment, when the projection image is generated, the image processing apparatus may project the images, which have been projected on the polyhedron, on at least one plane outside the polyhedron. FIGS. 3, 4, 25, and 26 show an operation of generating a projection image.

Figure 3:
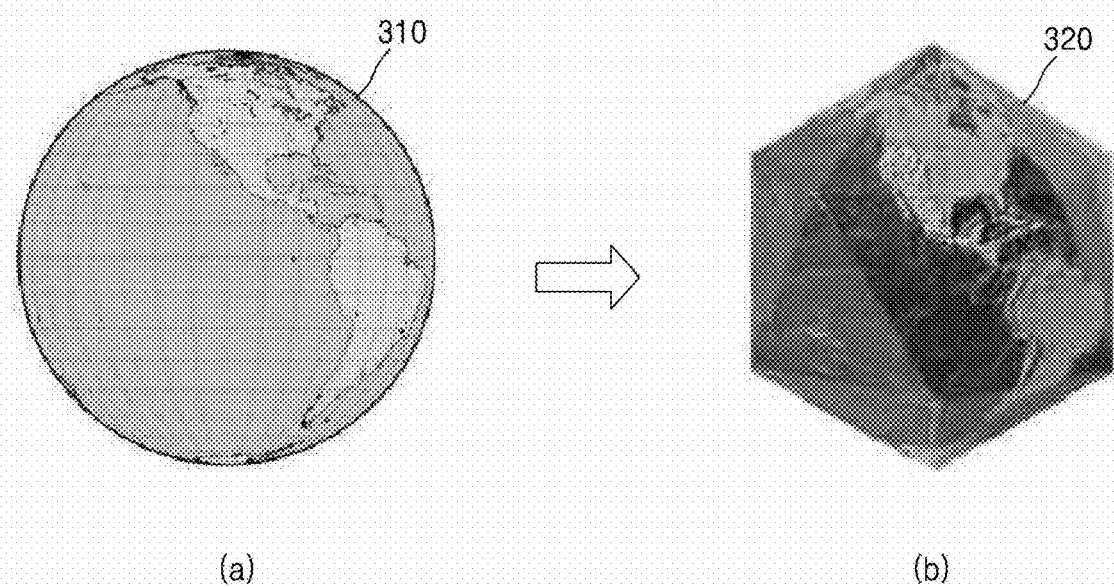
FIG. 3 illustrates an operation of projecting an acquired image on a polyhedron, according to an embodiment.

FIG. 3 illustrates an operation of projecting an acquired image on a polyhedron, according to an embodiment.

FIG. 3(a) illustrates an image 310 captured in at least two directions, which has been acquired in operation 210. Although FIG. 3(a) shows that a spherical image is acquired, the present embodiment is not limited thereto, and various shapes of images such as images captured in front, rear, left, right, up, and down directions may be acquired. FIG. 3(b) illustrates that the acquired image 310 is projected on a polyhedron 320. Particularly, FIG. 3(b) shows a regular icosahedron onto which the acquired image 310 is projected, by using the regular icosahedron as the polyhedron 320. According to an embodiment, the polyhedron 320 may include at least one triangle having the same shape and area. In this case, one face of the polyhedron 320 may be configured as another polygon made by combining two or more triangles. For example, a quadrangle made by combining two or more same triangles may configure one face of the polyhedron 320.

Figure 4:
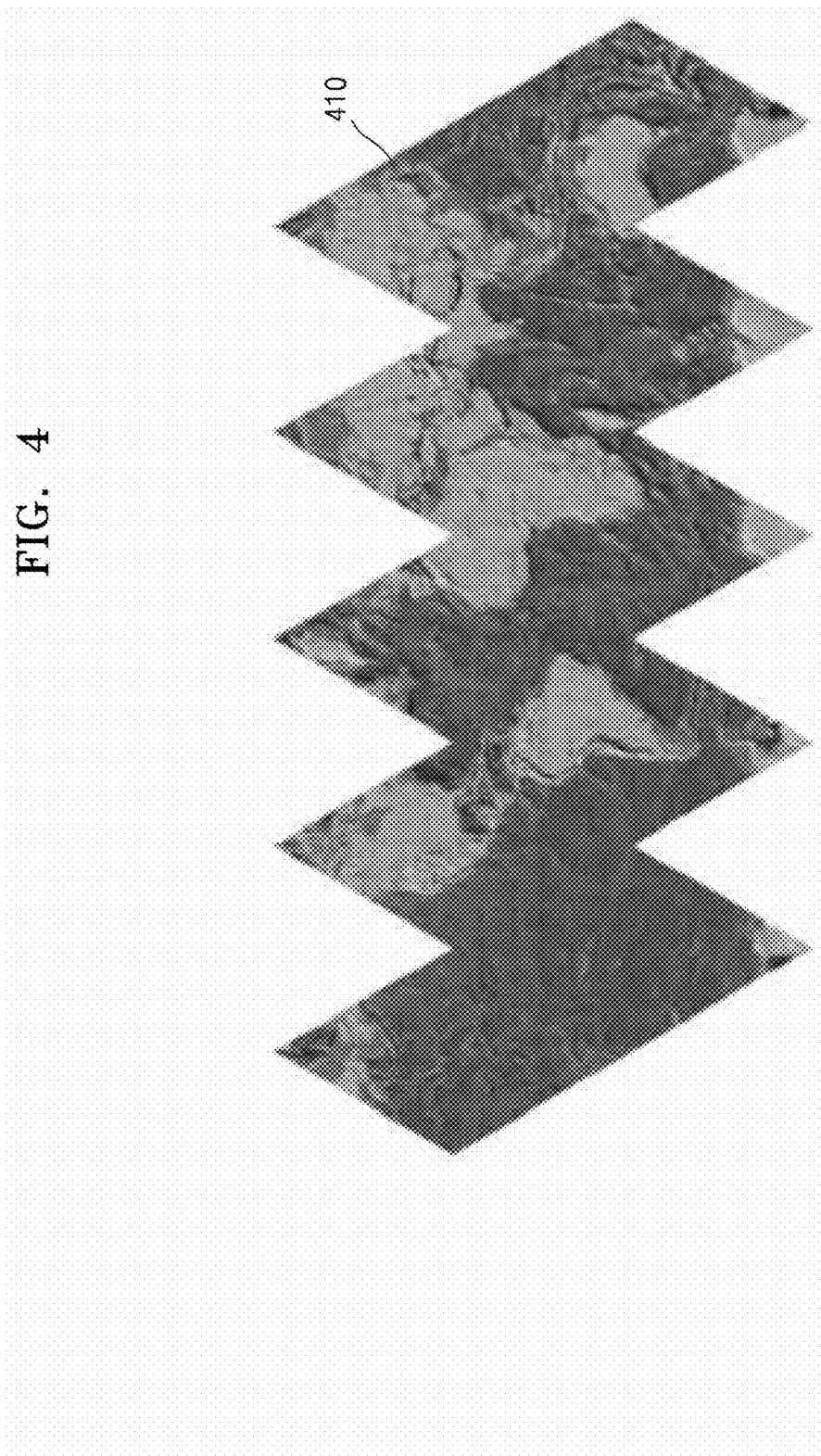
FIG. 4 illustrates a projection image according to an embodiment.

FIG. 4 illustrates a projection image according to an embodiment.

Referring to FIG. 4, a projection image 410 generated by projecting the acquired image 310 onto a development view in which the regular icosahedron shown in FIG. 3(*b*) is unfolded is shown. The projection image 410 may be the same as the development view in which the regular icosahedron onto which the acquired image 310 is projected is unfolded. According to an embodiment, the projection image may be an icosahedral projection image generated by using icosahedral projection.

With reference to FIGS. 3 and 4, an image processing operation has been described with an example in which the acquired image 310 is projected on a regular icosahedron. However, as described above, the polyhedron is not limited to a regular icosahedron, and an acquired image may be processed by projecting the acquired image onto various shapes of polyhedrons such as a regular octahedron and a regular tetrahedron. In addition, the generation of a projection image is not limited to the use of a development view of a polyhedron, and the projection image may be generated by using various methods such as the use of a projection view of a polyhedron.

Figure 25:
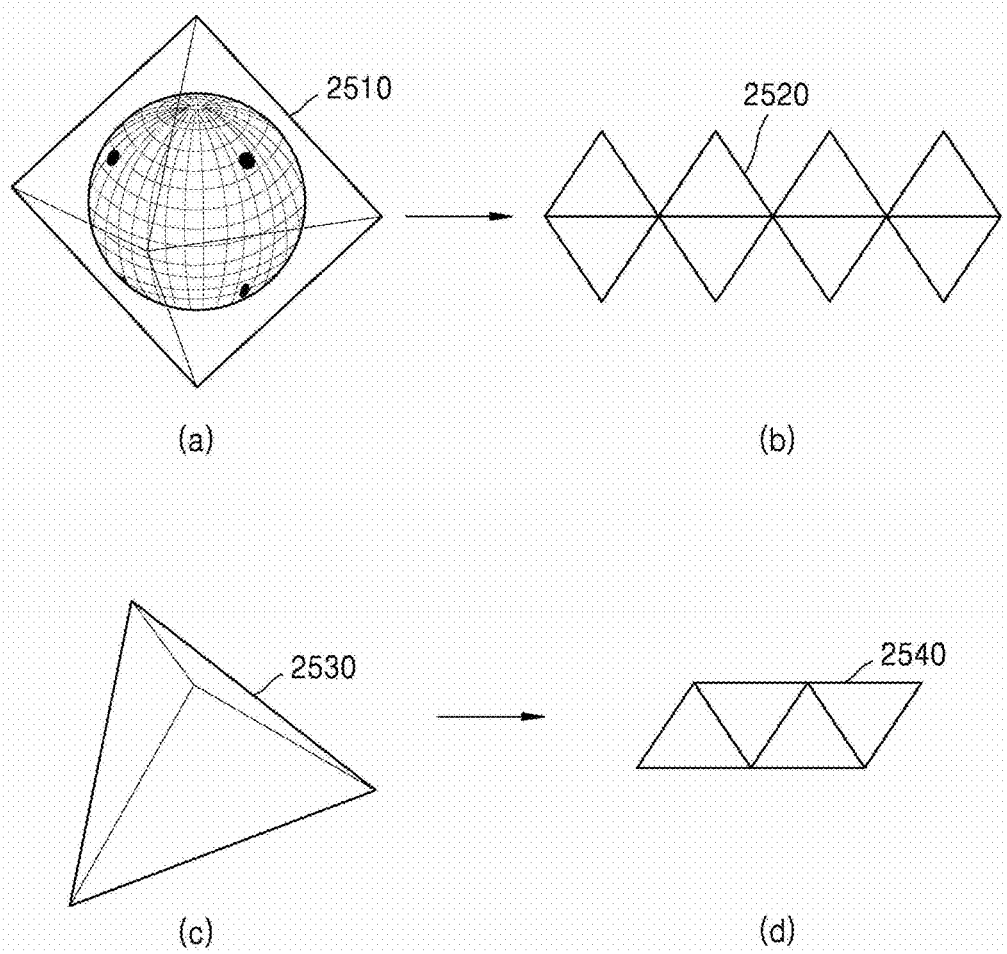
FIGS. 25 and 26 illustrate generation of a projection image, according to an embodiment.
Figure 26:
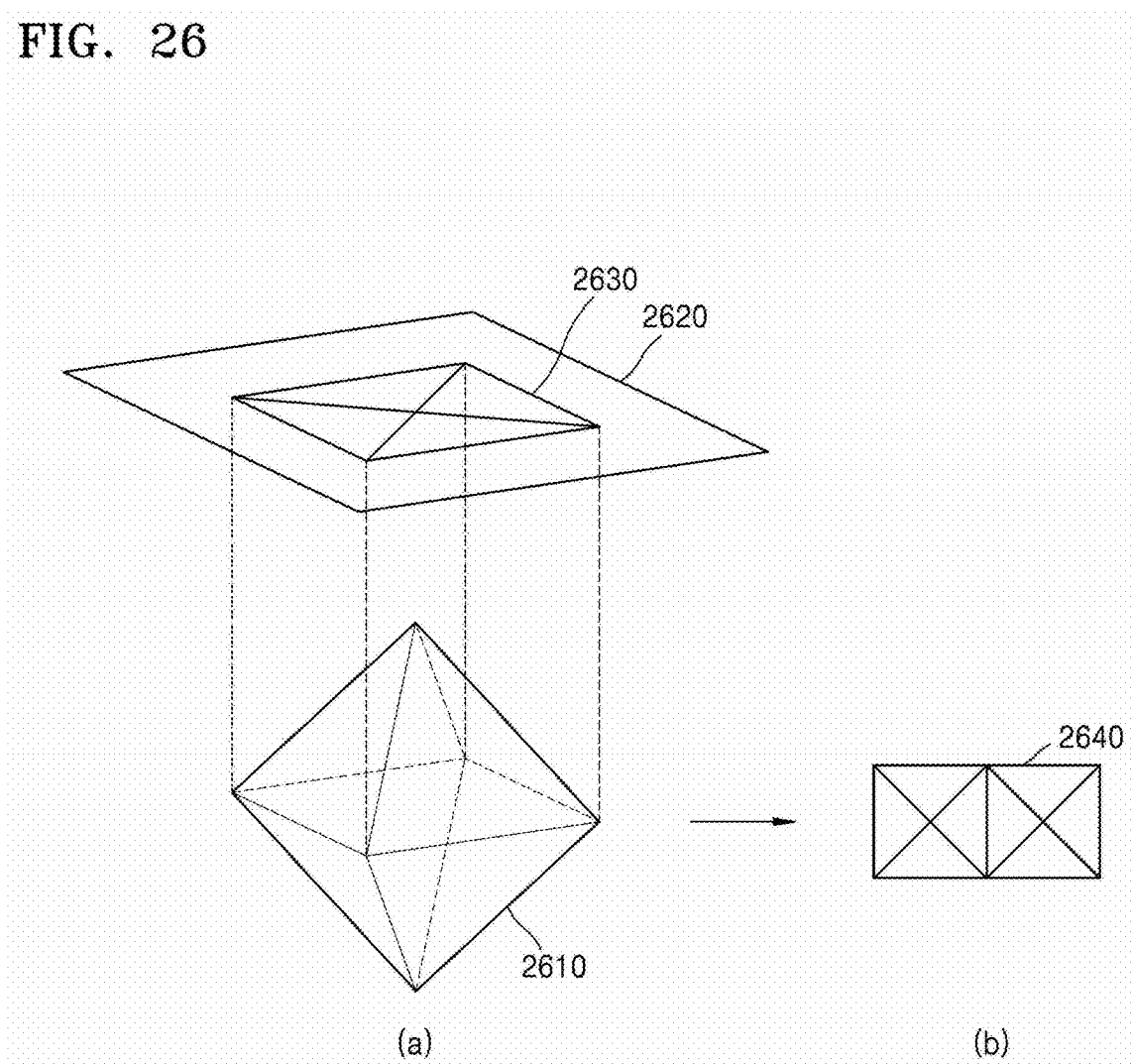

FIGS. 25 and 26 illustrate generation of a projection image, according to an embodiment.

FIG. 25(*a*) illustrates the use of a regular octahedron instead of a regular icosahedron as a polyhedron, wherein an acquired image is projected on a regular octahedron 2510, and FIG. 25(*c*) illustrates the use of a regular tetrahedron as a polyhedron, wherein an acquired image is projected on a regular tetrahedron 2530. FIG. 25(*b*) illustrates a projection image 2520 generated by projecting an acquired image onto a development view obtained by unfolding the regular octahedron shown in FIG. 25(*a*), and FIG. 25(*d*) illustrates a projection image 2540 generated by projecting an acquired image onto a development view obtained by unfolding the regular tetrahedron shown in FIG. 25(*c*). The projection image 2520 in FIG. 25(*b*) may be the same as the development view obtained by unfolding the regular octahedron onto which the acquired image is projected. The projection image 2540 in FIG. 25(*d*) may be the same as the development view obtained by unfolding the regular tetrahedron onto which the acquired image is projected.

According to an embodiment, a projection image may be generated by projecting an image, which has been projected onto a polyhedron, onto at least one plane outside the polyhedron. For example, as shown in FIG. 26(*a*), a projection view 2630 of a regular octahedron 2610 may be acquired by projecting an acquired image onto the regular octahedron 2610 and re-projecting an image on four upper faces among images, which have been projected onto the regular octahedron 2610, onto at least one plane 2620 located above an upper part of the regular octahedron. In addition, although not shown in FIG. 26(*a*), another projection view of the regular octahedron 2610 may be acquired by re-projecting an image on four lower faces among the images, which have been projected onto the regular octahedron 2610, onto at least one plane located under a lower part of the regular octahedron. As a result, as shown in FIG. 26(*b*), a projection image 2640 including two projection views of the regular octahedron 2610 may be generated. According to an embodiment, when a generated projection image has a rectangular shape like the projection image 2640 shown in FIG. 26(*b*), the generated projection image may be processed as it is without reshaping the generated projection image into a rectangular image.

Referring back to FIG. 2, in operation 230, the image processing apparatus moves a location of at least one pixel among pixels in the projection image 410 to reshape the projection image 410 into a rectangular image. Since the projection image 410 is a two-dimensional image obtained by unfolding the polyhedron 320, as shown in FIG. 4, there is a marginal space which is not concerned with the 360-degree image 310. This marginal space is merely a marginal space on a drawing but corresponds to data to be processed in an image processing process. Therefore, the more marginal space, the more data to be processed by the image processing apparatus, thereby decreasing processing efficiency. A process of reshaping the projection image 410 into a rectangular image is a process of reducing such a marginal space so as to reduce unnecessary data to be processed by the image processing apparatus.

According to an embodiment, movement of a location of a pixel indicates movement of pixel data. That is, pixel data of a specific pixel is stored as pixel data of another pixel instead of physical movement of the pixel.

According to an embodiment, when the projection image 410 is reshaped into a rectangular image, the rectangular image may be generated by moving only locations of pixels without removing pixels or adding new pixels. That is, the rectangular image may be generated by simply moving only locations of pixels without changing a total number of pixels and pixel data. Therefore, an area of the reshaped rectangular image is the same as an area of the projection image 410. According to an embodiment, when the projection image 410 is reshaped into a rectangular image, only locations of pixels are moved, and a total number of pixels and pixel data are not changed, and thus when only a location movement history of pixels or original locations of the pixels is or are obtained, the rectangular image may be easily restored into the projection image 410.

Figure 27:
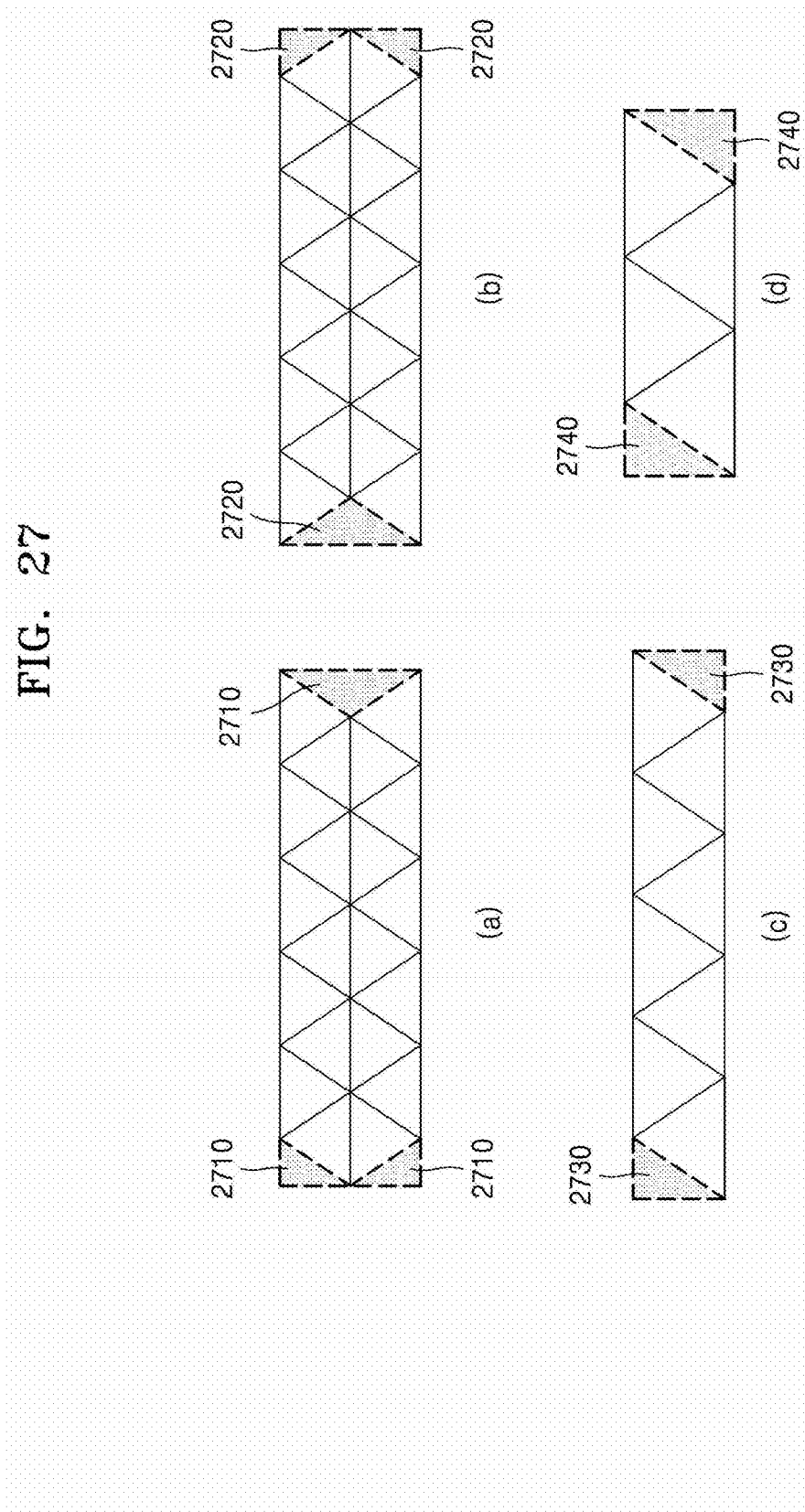
FIG. 27 illustrates a rectangular image reshaping method according to an embodiment.

According to an embodiment, when a projection image is reshaped into a rectangular image, the rectangular image may be generated by moving pixels in the projection image and then adding a marginal space. For example, as shown in FIGS. 27(*a*) to 27(*c*), a rectangular image may be generated by moving pixels in a projection image generated using a development view of a regular icosahedron or a regular octahedron and then adding at least one marginal space 2710, 2720, or 2730 around the pixels-moved projection image. According to another embodiment, when a projection image is reshaped into a rectangular image, the rectangular image may be generated by adding a marginal space without moving pixels in the projection image. For example, as shown in FIG. 27(*d*), the rectangular image may be generated by adding at least one marginal space 2740 around the projection image without moving pixels in the projection image generated using a development view of a regular tetrahedron. When a reshaped rectangular image includes a marginal space, an area of the reshaped rectangular image may differ from an area of a projection image.

According to an embodiment, when the projection image 410 is reshaped into a rectangular image, a parallel movement direction of pixels included in each row is determined for each row, and the pixels included in each row may be horizontally moved to the left or the right for each row such that the pixels are sequentially filled from a left edge or a right edge of each row according to the determined parallel movement direction. In addition, according to an embodiment, when the projection image 410 is reshaped into a rectangular image, a vertical movement direction of pixels included in each column is determined for each column, and the pixels included in each column may be vertically moved upward or downward for each column such that the pixels are sequentially filled from a top edge or a bottom edge of each column according to the determined vertical movement direction.

Vertical movement and horizontal movement of pixels are described with reference to a particular embodiment. FIGS. 5 to 11 illustrate an embodiment of a method of reshaping the projection image 410 into a rectangular image through vertical movement and horizontal movement of pixels and a result thereof.

Figure 5:
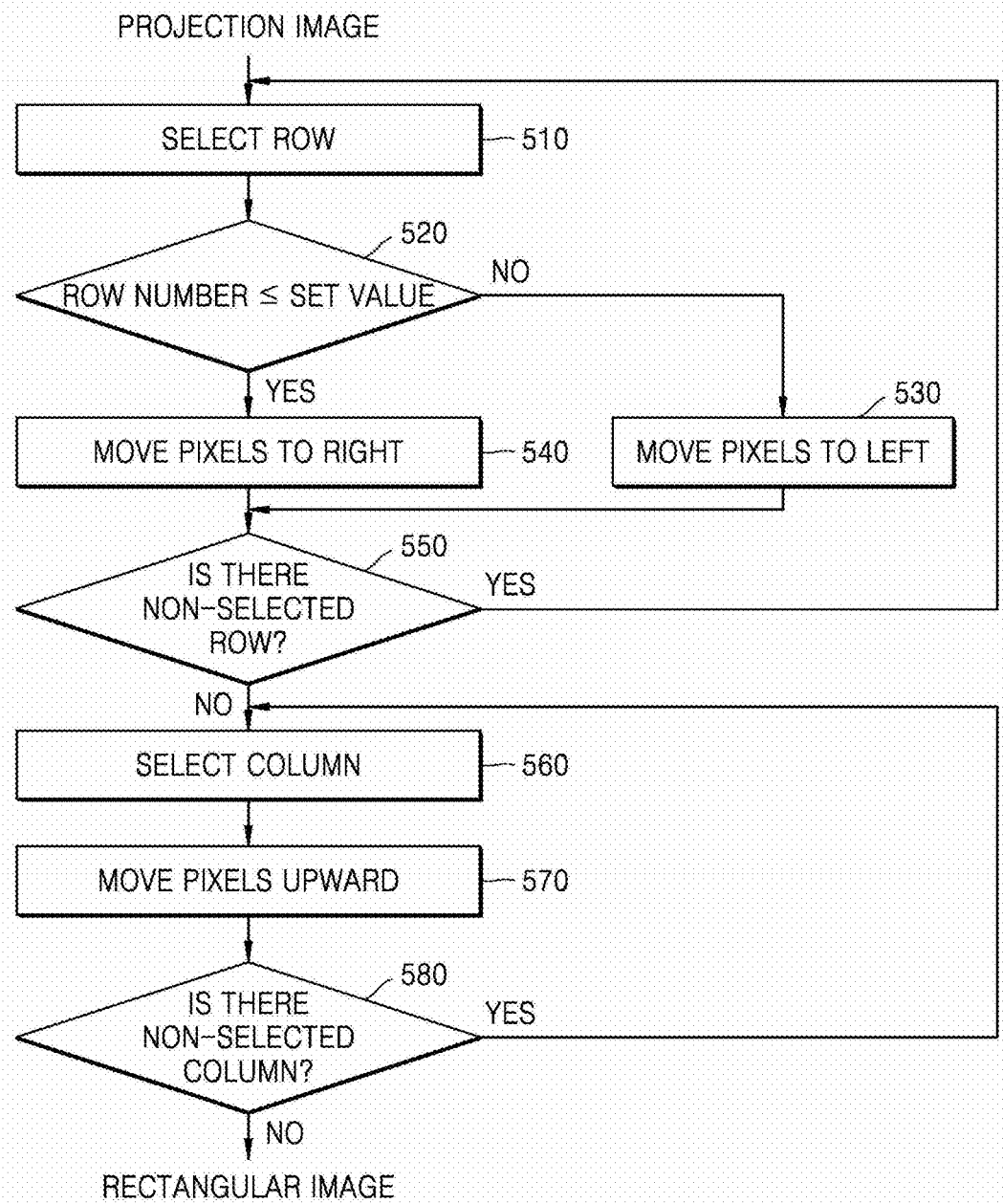
FIG. 5 is a flowchart of a rectangular image reshaping method according to an embodiment.
Figure 6:
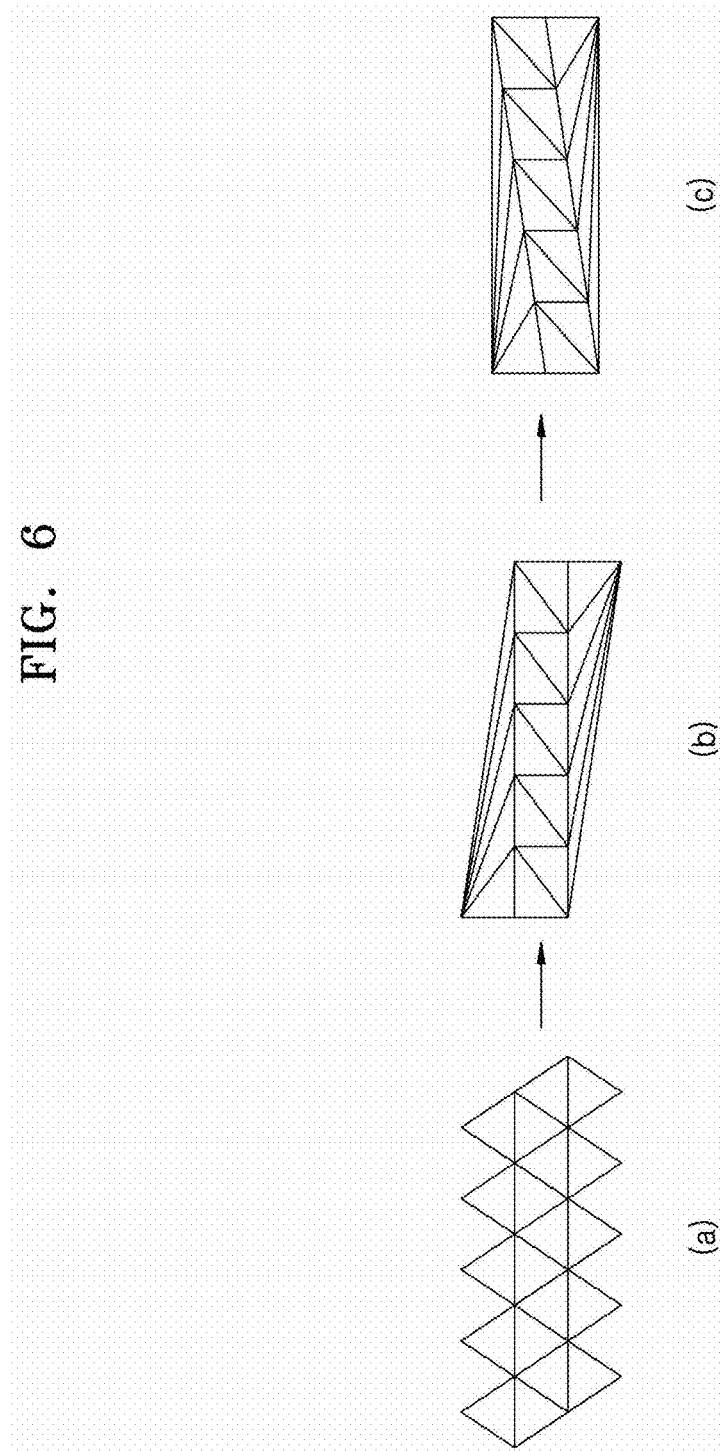
FIG. 6 illustrates the rectangular image reshaping method according to an embodiment.

FIG. 5 is a flowchart of a rectangular image reshaping method according to an embodiment, and FIG. 6 illustrates the rectangular image reshaping method according to an embodiment.

Referring to FIG. 5, first, in operation 510, the image processing apparatus selects one row from a plane on which the projection image 410 is shown. In this case, a row in which the uppermost pixel of the projection image 410 is located may be an x axis.

Thereafter, in operation 520, the image processing apparatus determines whether a number of the selected row is a set value or lower. Referring to FIG. 6, FIG. 6(a) shows a projection image. The projection image shown in FIG. 6(a) has a shape in which triangles are piled up in three layers. According to an embodiment, to move upper two layers in one direction and move a lower one layer in an opposite direction, the set value may be ⅔ of a total row length. However, this is only illustrative, and various references may be set according to embodiments.

When it is determined in operation 520 that the number of the selected row is the set value or lower, the image processing apparatus proceeds to operation 530 and may move pixels included in the selected row to the left such that the pixels are sequentially filled from a left edge of the selected row. Otherwise, when it is determined in operation 520 that the number of the selected row is the set value or higher, the image processing apparatus proceeds to operation 540 and may move pixels included in the selected row to the right such that the pixels are sequentially filled from a right edge of the selected row.

Thereafter, in operation 550, the image processing apparatus determines whether there is non-selected row, and when there is a non-selected row, the image processing apparatus proceeds back to operation 510 to repeat the above-described process.

Operations 510 to 550 are a process of reshaping the projection image shown in FIG. 6(a) into an image shown in FIG. 6(b), and this process is described in more detail with reference to FIGS. 7 and 8.

Figure 7:
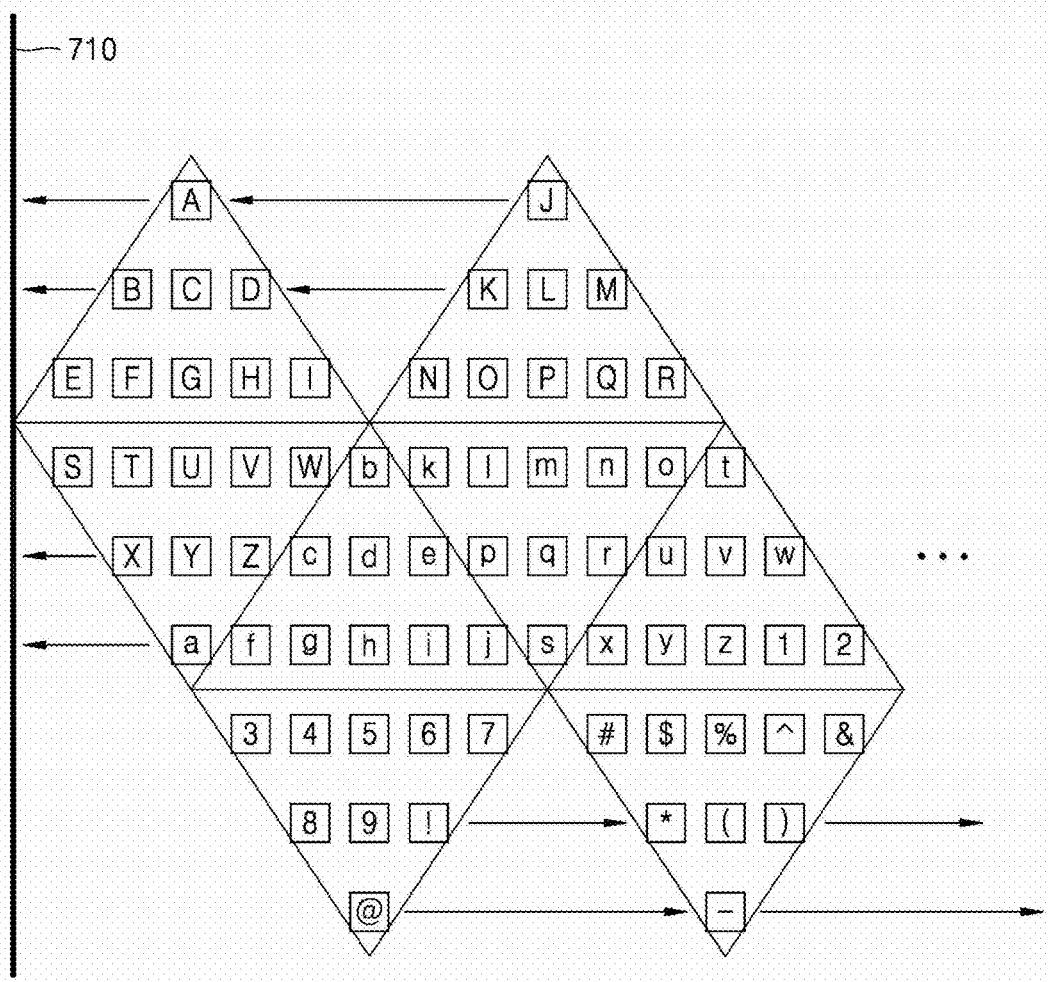
FIG. 7 illustrates horizontal movement of pixels, according to an embodiment.
Figure 8:
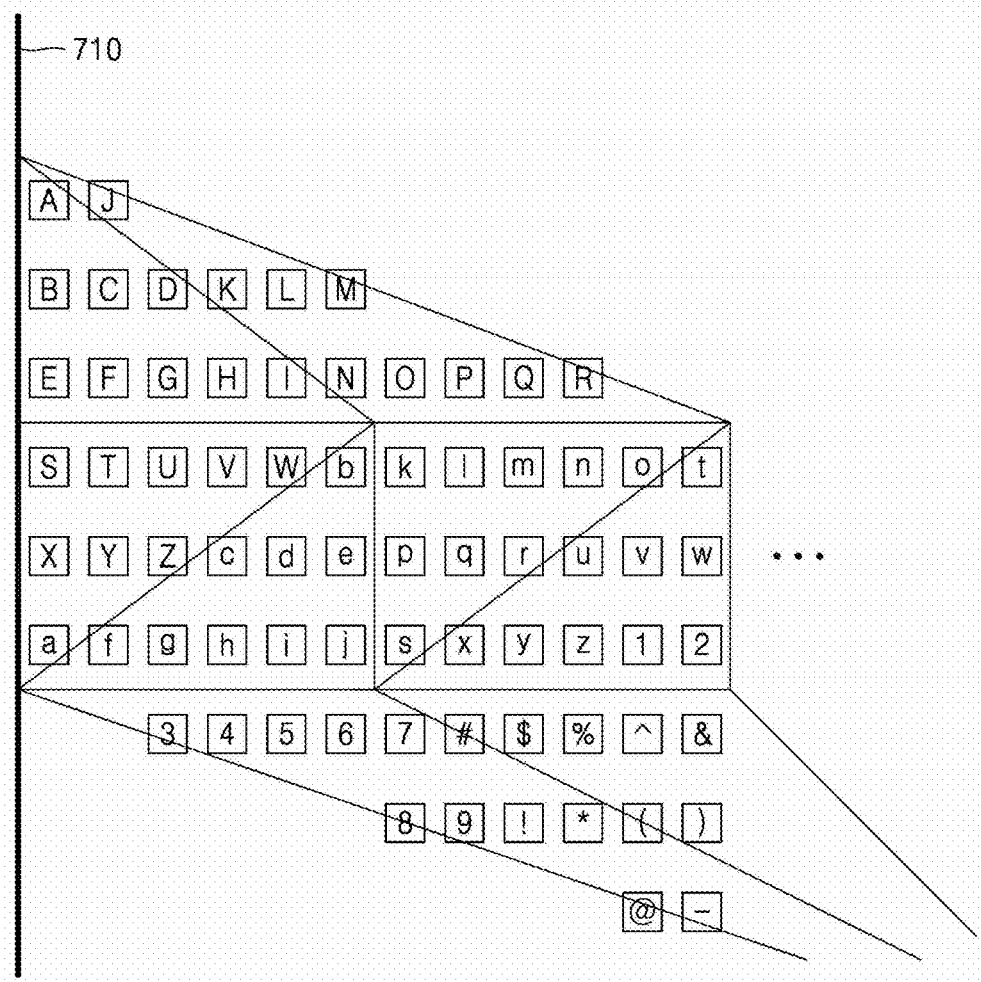
FIG. 8 illustrates a result of the horizontal movement of the pixels, according to an embodiment.

FIG. 7 illustrates horizontal movement of pixels, according to an embodiment, and FIG. 8 illustrates a result of the horizontal movement of the pixels, according to an embodiment.

Referring to FIG. 7, each triangle included in a projection image includes nine pixels, and each pixel indicated with a quadrangle has each pixel data. It may be set that a row including the uppermost pixel is an x axis and a row number increases downward. When a set value is ⅔ of a total row length, that is, a height of the projection image, for rows having a row number less than or equal to ⅔ of the total row length, pixels included in each row may be moved to the left such that the pixels are sequentially filled from a left edge 710 of each row. In addition, for rows having a row number exceeding ⅔ of the total row length, pixels included in each row may be moved to the left such that the pixels are sequentially filled from a right edge (not shown) of each row.

Therefore, in FIG. 7, upper rows including a row including pixels having pixel data of a, f, g, h, i, j, s, x, y, z, 1, and 2 may be moved to the left, and upper rows including a row including pixels having pixel data of 3, 4, 5, 6, 7, #, $, %, ^, and & may be moved to the right.

FIG. 8 shows a movement result of pixels. The movement result shown in FIG. 8 is to describe horizontal movement of pixels, according to an embodiment. That is, it is assumed that only pixels indicated to have pixel data are moved, and a horizontal movement result of the pixels is shown in FIG. 8. The projection image shown in FIG. 6(a) includes a greater number of triangles than triangles shown in FIG. 7, and thus, an actual horizontal movement result of pixels may differ from the horizontal movement result shown in FIG. 8. For example, the uppermost row may further include pixels to the right in addition to two pixels having pixel data of A and J. In addition, pixels included in the lower three rows, which have been moved to the right, may be further moved to a right edge, which is not shown in FIG. 8.

According to an embodiment, the projection image shown in FIG. 6(a) may be reshaped into the image shown in FIG. 6(b) through the above-described process.

In operation 550, the image processing apparatus determines whether there is a non-selected row, and when there is not a non-selected row, the image processing apparatus proceeds to operation 560 to select one column from the plane on which the projection image is shown. In this case, a column in which the leftmost pixel of the projection image is located may be a y axis.

In operation 570, the image processing apparatus may move pixels included in the selected column upward such that the pixels are sequentially filled from a top edge of the selected column.

In operation 580, the image processing apparatus determines whether there is a non-selected column, and when there is a non-selected column, the image processing apparatus proceeds back to operation 560 to repeat the above-described process. When it is determined in operation 580 that there is not a non-selected column, reshaping into the rectangular image is completed.

Operations 560 to 580 are a process of reshaping the reshaped projection image shown in FIG. 6(b) into a rectangular image shown in FIG. 6(c), and this process is described in more detail with reference to FIGS. 9 and 10.

Figure 9:
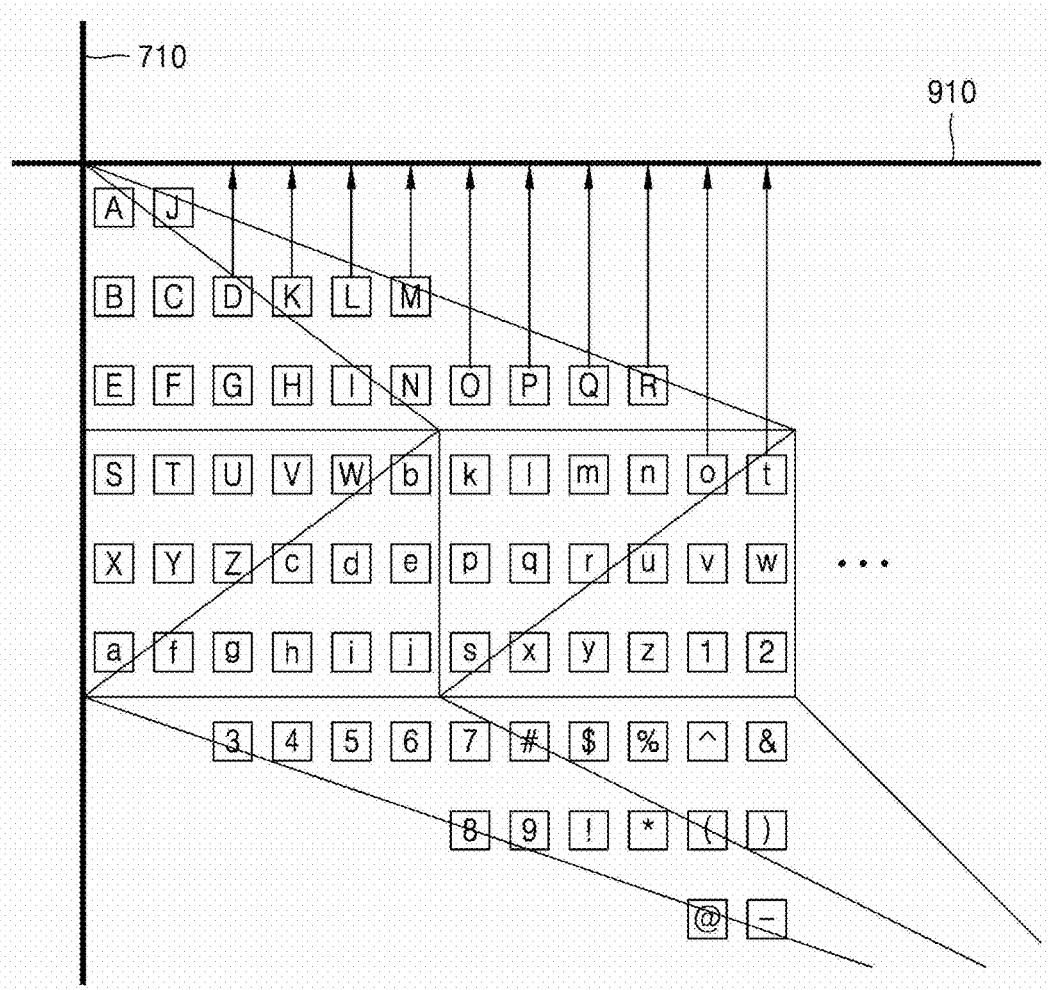
FIG. 9 illustrates vertical movement of pixels, according to an embodiment.
Figure 10:
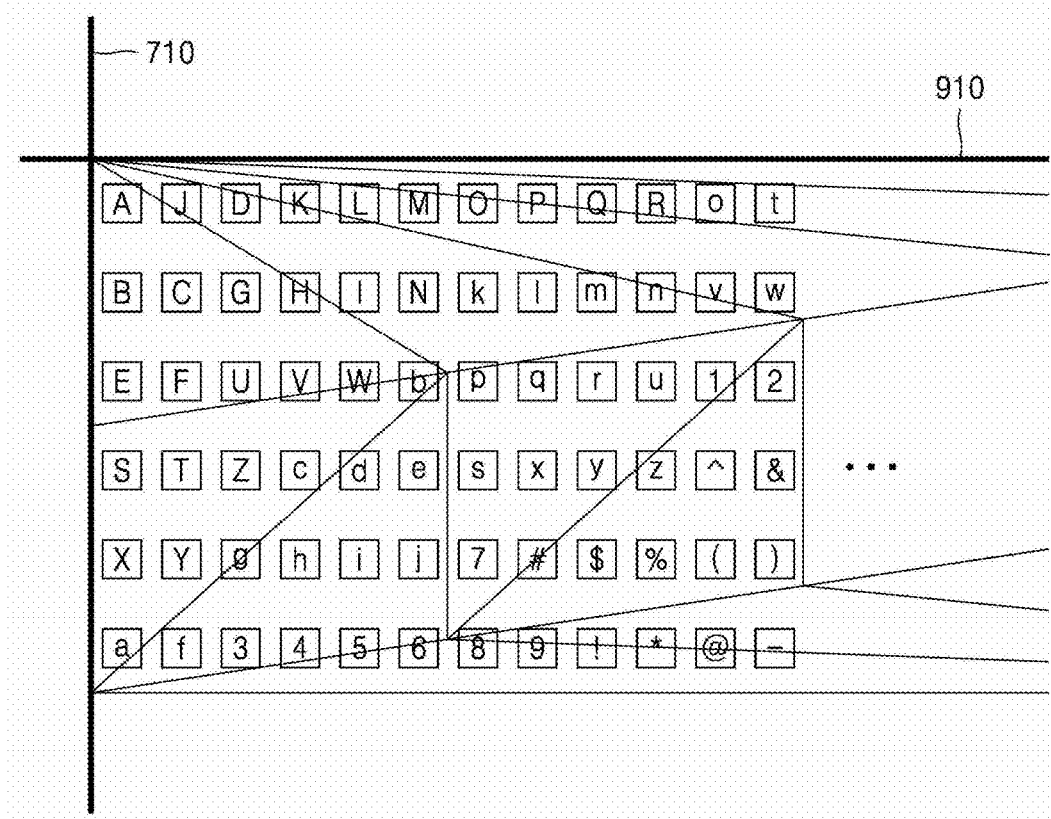
FIG. 10 illustrates a result of the vertical movement of the pixels, according to an embodiment.

FIG. 9 illustrates vertical movement of pixels, according to an embodiment, and FIG. 10 illustrates a result of the vertical movement of the pixels, according to an embodiment.

Referring to FIG. 9, the image processing apparatus may move pixels included in each column such that the pixels are sequentially filled from a top edge 910 of each column. Therefore, all columns located to the right of a column including pixels having pixel data of D, G, U, Z, g, and 3 may be moved upward. A column including pixels having pixel data of A, B, E, S, X, and a and a column including pixels having pixel data of J, C, F, T, Y, and f are not moved since pixels are sequentially filled from the top edge. The columns including the pixels which are not moved will be described later.

FIG. 10 shows a movement result of the pixels. The movement result shown in FIG. 10 is to describe vertical movement of pixels, according to an embodiment, and is a vertical movement result based on the horizontal movement result shown in FIG. 8. Therefore, an actual horizontal movement result of pixels may differ from the vertical movement result shown in FIG. 10.

According to an embodiment, operations 560 to 580 and the pixel vertical movement process shown in FIGS. 9 and 10 describe a process of moving pixels included in a selected column upward such that the pixels are sequentially filled from a top edge of the selected column. However, this is only illustrative, and pixels included in a selected column may be moved downward such that the pixels are sequentially filled from a bottom edge of the selected column.

According to an embodiment, even when pixels included in each row or column is horizontally or vertically moved, adjacent pixels in a reshaped rectangular image may have continuous pixel data. According to an embodiment, In FIG. 7, a pixel having pixel data of A and a pixel having pixel data of J are adjacently located in a polyhedron before the projection image 410 is generated. That is, the projection image 410 is obtained by unfolding the polyhedron 320, and thus, the pixel having the pixel data of A and the pixel having the pixel data of J are physically separated in the projection image 410, but the two pixels are originally located to be adjacent at one vertex in the polyhedron 320.

In general, adjacent pixels in an image have a high probability that the pixels have continuous pixel data. Therefore, the pixel data A and J have a high probability that the pixel data A and J have continuous data. Herein, the continuous data indicates data of which data values are gradually changed without a rapid change. In image processing, continuous data may be more quickly and efficiently processed than discontinuous data. Adjacent pixels in a reshaped rectangular image have a high probability that the adjacent pixels have continuous pixel data, and thus, the adjacent pixels may be quickly and efficiently processed.

According to an embodiment, the projection image shown in FIG. 6(b) may be reshaped into the image shown in FIG. 6(c) through the process described above.

Figure 11:
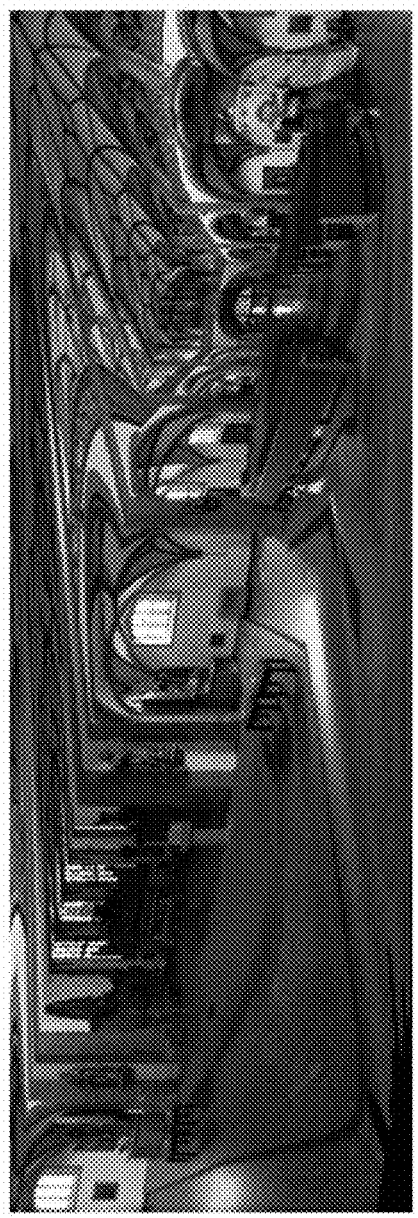
FIG. 11 illustrates a reshaped actual rectangular image according to an embodiment.

FIG. 11 illustrates a reshaped actual rectangular image according to an embodiment.

FIG. 11 shows an actual rectangular image reshaped through the method described with reference to FIGS. 5 to 10. Referring to FIG. 11, similar to FIG. 6(c), the reshaping into the rectangular image may be performed in a shape in which pixels are gathered to an upper left end and a lower right end.

Referring back to FIG. 2, according to an embodiment, in reshaping into a rectangular image, a plurality of pixels including pixels forming a first boundary of a projection image may be moved such that the pixels forming the first boundary are connected to a second boundary which is an opposite boundary connected to the first boundary.

This will be described through particular embodiments. FIGS. 12 to 15 and 28 to 38 show particular embodiments in which reshaping into a rectangular image is performed by moving a plurality of pixels including pixels forming a first boundary of a projection image such that the pixels forming the first boundary are connected to a second boundary which is an opposite boundary connected to the first boundary. According to an embodiment, the projection image may be generated using a development view of a regular icosahedron or a regular octahedron, both the first boundary and the second boundary may include a plurality of lines, and setting a reference point and moving a plurality of pixels to an opposite side of the reference point may be repeated.

Figure 12:
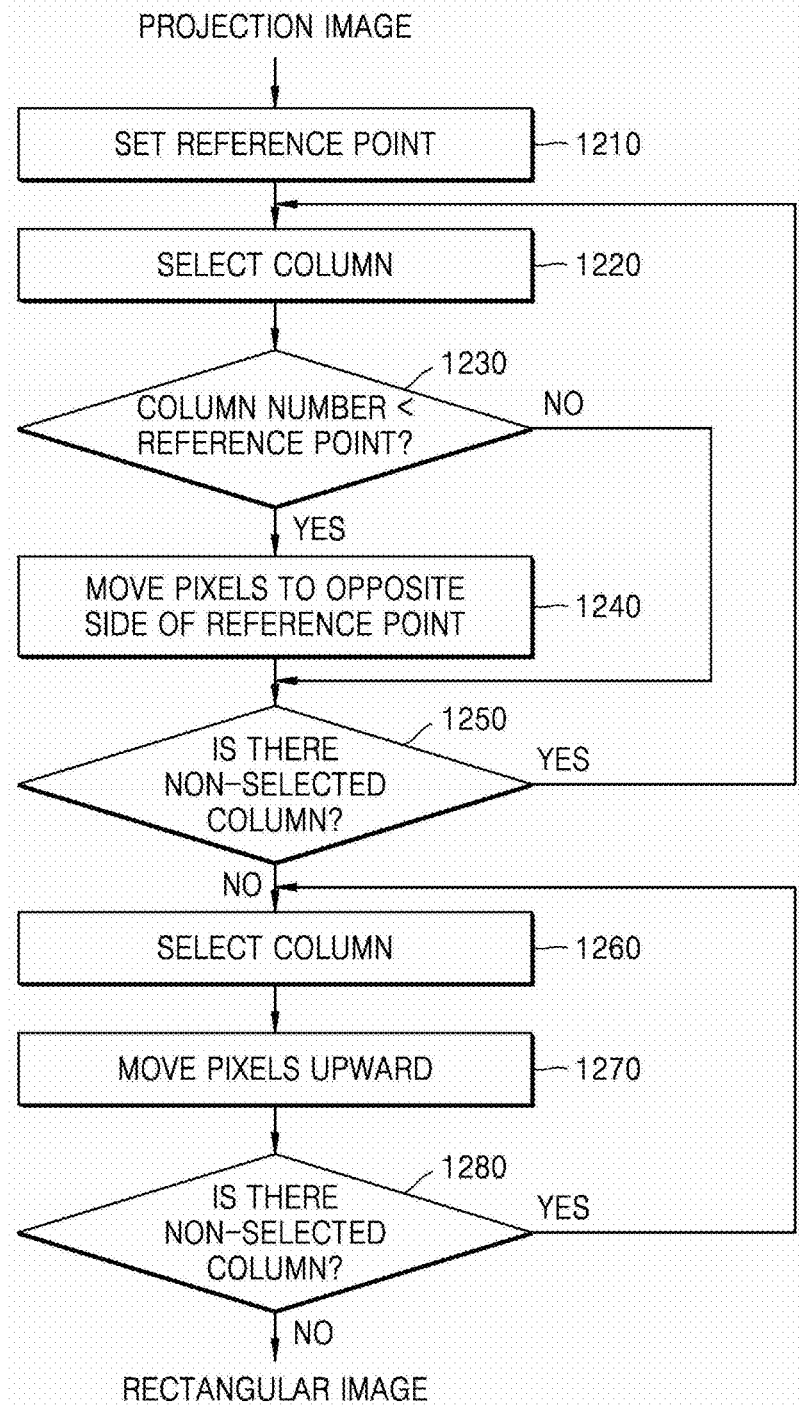
FIG. 12 is a flowchart of a rectangular image reshaping method according to another embodiment.
Figure 13:
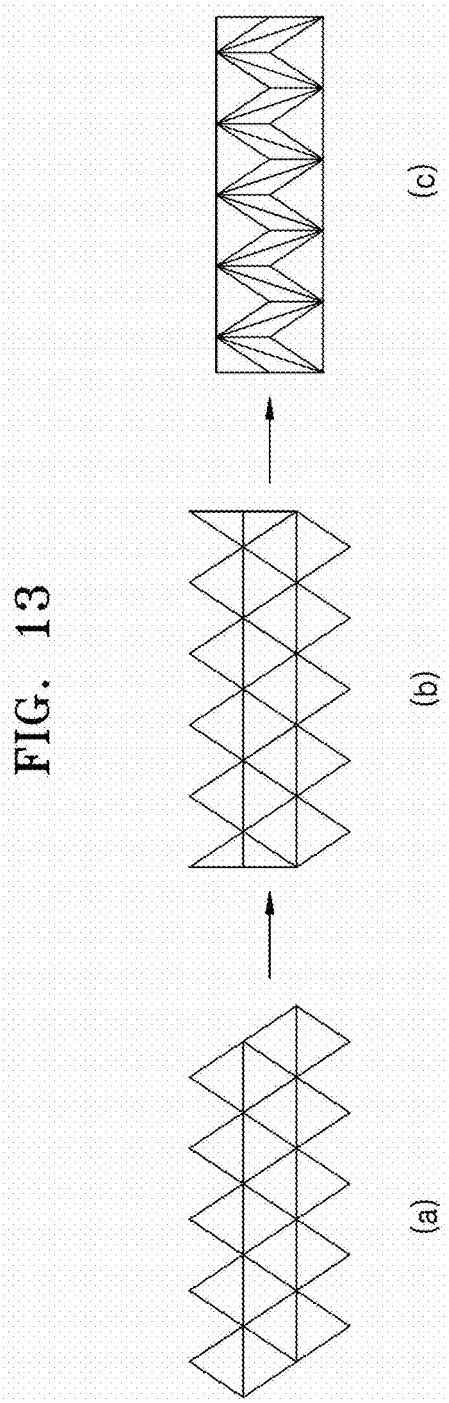
FIG. 13 illustrates the rectangular image reshaping method according to another embodiment.

FIG. 12 is a flowchart of a rectangular image reshaping method according to another embodiment, and FIG. 13 illustrates the rectangular image reshaping method according to another embodiment.

Referring to FIG. 12, first, in operation 1210, the image processing apparatus sets a reference point. The reference point is a criterion for discriminating pixels to be moved from pixels not to be moved. According to an embodiment, a point at 1/10 of a total row length, that is, a horizontal length based on a left edge of a projection image, may be set as the reference point. However, this is only illustrative, and various reference points may be set according to embodiments.

In operation 1220, the image processing apparatus selects one column from a plane on which the projection image is shown.

In operation 1230, the image processing apparatus compares the selected column with the reference point, and when it is determined that a column number of the selected column is lower than a column number of the reference point, the image processing apparatus proceeds to operation 1240 to move pixels included in the selected column to an opposite side of the reference point. According to an embodiment, a plurality of pixels including pixels forming a first boundary of the projection image may be moved such that the pixels forming the first boundary are connected to a second boundary which is an opposite boundary connected to the first boundary.

If it is determined in operation 1230 that the column number of the selected column is higher than or equal to the column number of the reference point, the image processing apparatus directly proceeds to operation 1250.

In operation 1250, the image processing apparatus determines whether there is a non-selected column, and when there is a non-selected column, the image processing apparatus proceeds back to operation 1220 to repeat the above-described process.

Operations 1210 to 1250 are a process of reshaping a projection image shown in FIG. 13(a) into an image shown in FIG. 13(b), and this process is described in more detail with reference to FIG. 14.

Figure 14:
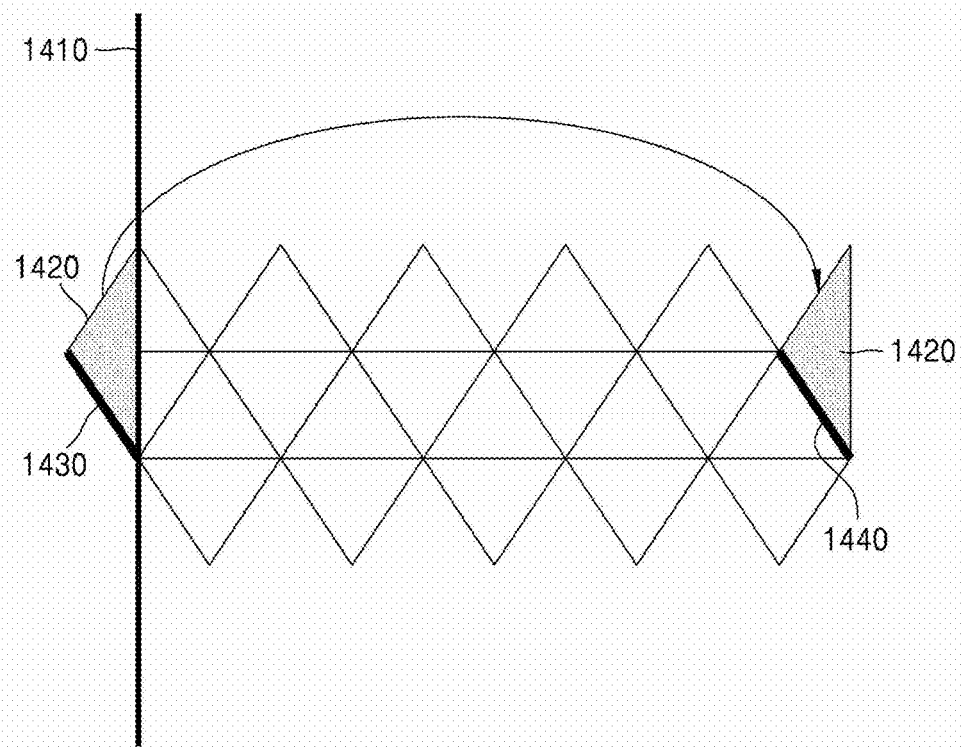
FIG. 14 is a sequence diagram of movement of pixels, according to another embodiment.

FIG. 14 is a sequence diagram of movement of pixels, according to another embodiment.

Referring to FIG. 14, a point at 1/10 of a horizontal length based on a left edge of a projection image may be set as a reference point 1410. According to an embodiment, pixels 1420 having a lower column number than a column number of the reference point are moved to an opposite side of the reference point. In this case, pixels forming a first boundary 1430 may be moved such that the pixels forming the first boundary 1430 are connected to a second boundary 1440 which is an opposite boundary connected to the first boundary.

According to an embodiment, the first boundary 1430 and the second boundary 1440 are a line forming one edge in the polyhedron 320 before the projection image 410 is generated. That is, the projection image 410 is obtained by unfolding the polyhedron 320, and thus, the first boundary 1430 and the second boundary 1440 are physically separated in the projection image 410, but the first boundary 1430 and the second boundary 1440 are originally a line forming one edge in the polyhedron 320. Therefore, even when a plurality of pixels including pixels forming a first boundary are moved such that the pixels forming the first boundary are connected to a second boundary which is an opposite boundary connected to the first boundary, the projection image 410 is not changed, but there is only a difference in which point is a reference point to show the projection image 410.

In operation 1250, the image processing apparatus determines whether there is a non-selected row, and when there is not a non-selected row, the image processing apparatus proceeds to operation 1260 to select one column from the plane on which the projection image is shown.

Operations 1260 to 1280 are the same as operations 560 to 580 in FIG. 5. Therefore, repeated descriptions are given in brief.

In operation 1270, the image processing apparatus may move pixels included in the selected column upward such that the pixels are sequentially filled from a top edge of the selected column.

In operation 1280, the image processing apparatus determines whether there is a non-selected column, and when there is a non-selected column, the image processing apparatus proceeds back to operation 1260 to repeat the above-described process.

Operations 1260 to 1280 are a process of reshaping the reshaped projection image shown in FIG. 13(*b*) into a rectangular image shown in FIG. 13(*c*), and this process is described in more detail with reference to FIG. 15.

Figure 15:
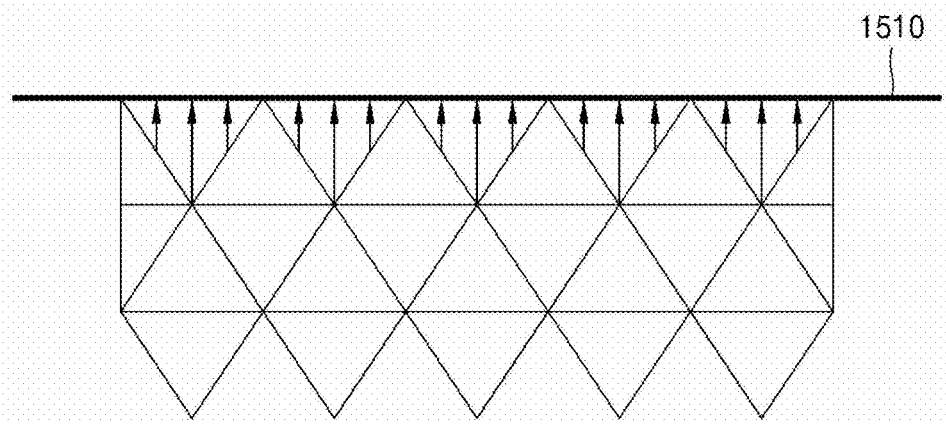
FIG. 15 illustrates vertical movement of pixels, according to another embodiment.

FIG. 15 illustrates vertical movement of pixels, according to another embodiment.

Referring to FIG. 15, the image processing apparatus may move pixels included in each column upward such that the pixels are sequentially filled from a top edge 1510 of each column. There may be a column including pixels which are not moved since the pixels are already filled sequentially from the top. The column including pixels which are not moved will be described later.

According to an embodiment, the projection image shown in FIG. 13(*b*) may be reshaped into the image shown in FIG. 13(*c*) through the above-described process.

Figure 28:
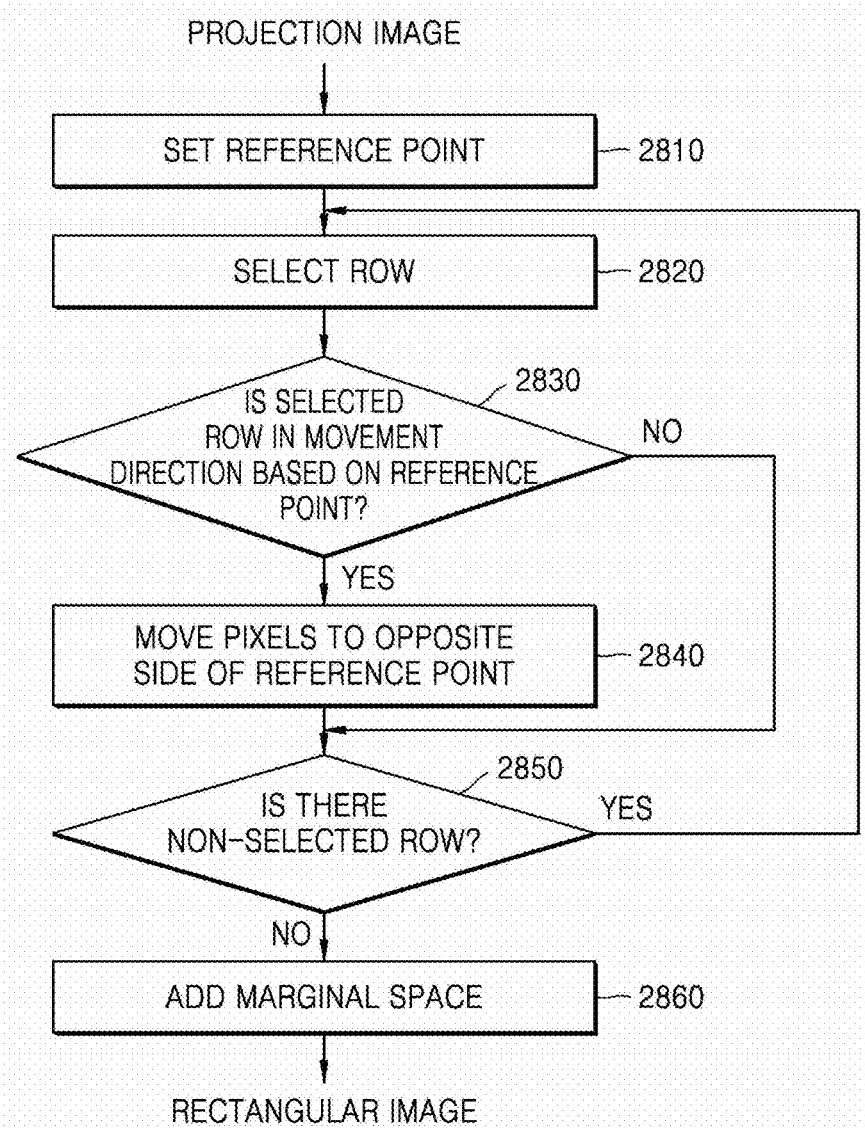
FIG. 28 is a flowchart of a rectangular image reshaping method according to another embodiment.

FIG. 28 is a flowchart of a rectangular image reshaping method according to another embodiment.

Referring to FIG. 28, first, in operation 2810, the image processing apparatus sets a reference point. According to an embodiment, a specific point may be set as the reference point. In operation 2820, the image processing apparatus selects one row from a plane on which a projection image is shown. In operation 2830, the image processing apparatus compares the selected row with the reference point, and when it is determined that the selected row is in a movement direction based on the reference point, the image processing apparatus proceeds to operation 2840 to move pixels included in the selected row to an opposite side of the reference point. According to an embodiment, a plurality of pixels including pixels forming a first boundary of the projection image may be moved such that the pixels forming the first boundary are connected to a second boundary which is an opposite boundary connected to the first boundary. It is determined in operation 2830 that the selected row is not in the movement direction based on the reference point, the image processing apparatus directly proceeds to operation 2850. In operation 2850, the image processing apparatus determines whether there is a non-selected row, and when there is a non-selected row, the image processing apparatus proceeds back to operation 2820 to repeat the above-described process.

Figure 29:
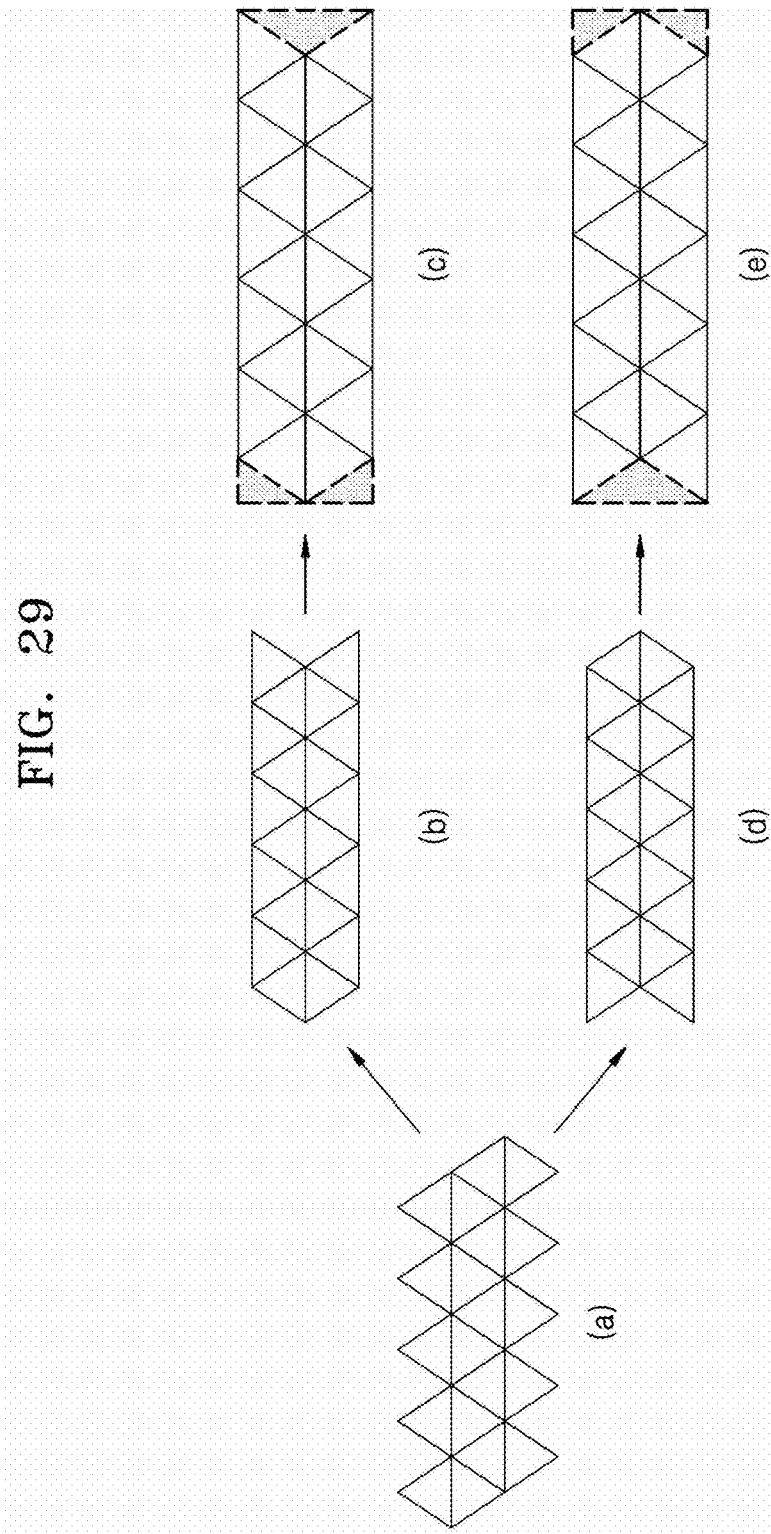
FIG. 29 illustrates the rectangular image reshaping method according to another embodiment.

Operations 2810 to 2850 are a process of reshaping a projection image shown in FIG. 29(*a*) to an image shown in FIG. 29(*b*) or 29(*d*) or reshaping a projection image shown in FIG. 32(*a*) to an image shown in FIG. 32(*b*) or 32(*d*), and this process is described in more detail with reference to FIGS. 30, 31, 33, and 34.

FIGS. 30, 31, 33, and 34 illustrate movement of pixels, according to another embodiment. According to an embodiment, a projection image may be generated using a development view of a regular icosahedron or a regular octahedron.

Figure 30:
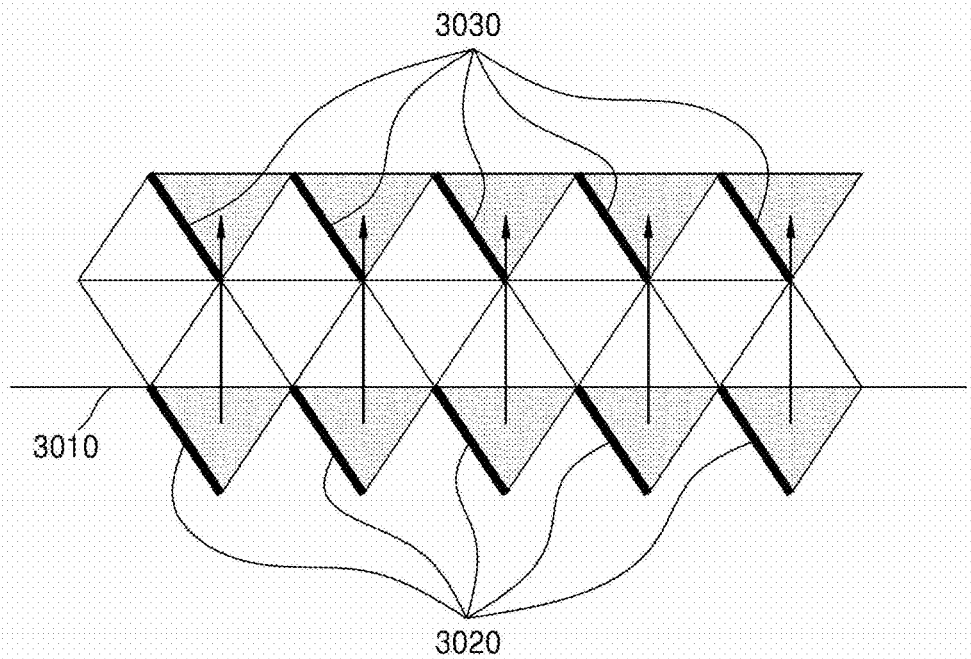
FIGS. 30 and 31 illustrate movement of pixels, according to another embodiment.

Referring to FIG. 30, a point at ⅓ of a vertical length based on a bottom edge of a projection image may be set as a reference point 3010. According to an embodiment, pixels in a movement direction based on the reference point 3010, that is, lower pixels based on the reference point 3010, are moved to an opposite side of the reference point. In this case, pixels forming a first boundary 3020 may be moved such that the pixels forming the first boundary 3020 are connected to a second boundary 3030 which is an opposite boundary connected to the first boundary. According to an embodiment, each of the first boundary 3020 and the second boundary 3030 may include a plurality of lines.

Figure 31:
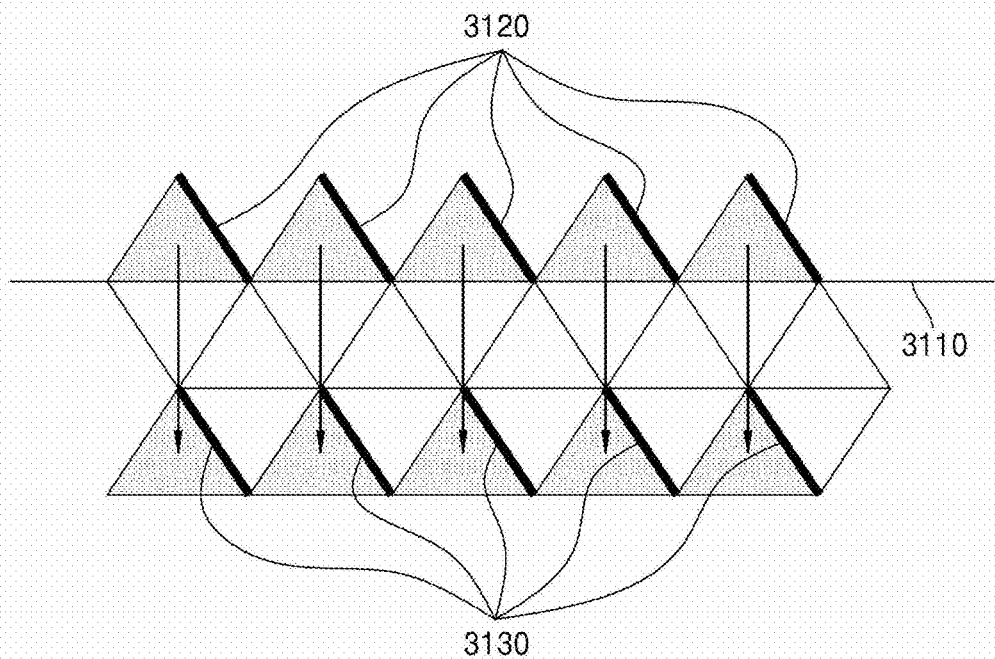
Figure 32:
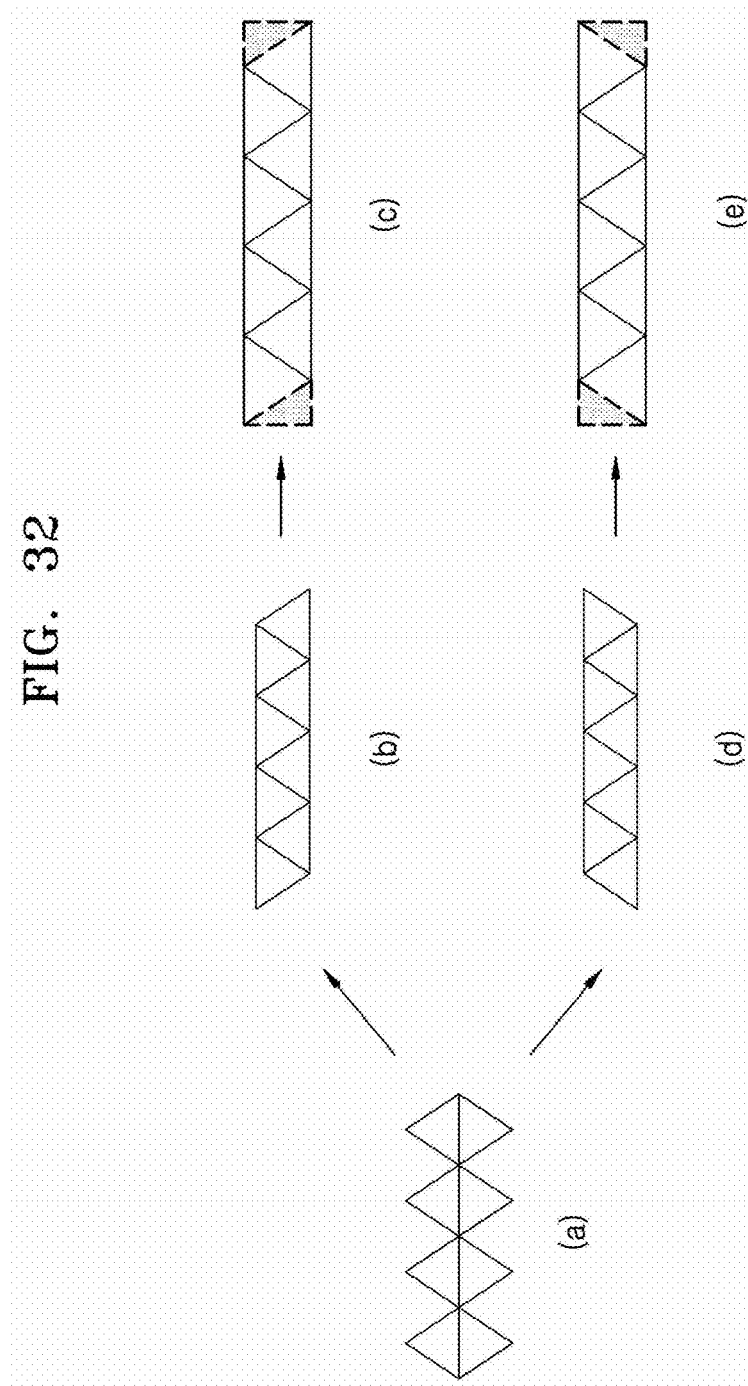
FIG. 32 illustrates a rectangular image reshaping method according to another embodiment.

Referring to FIG. 31, a point at ⅓ of a vertical length based on a top edge of a projection image may be set as a reference point 3110. According to an embodiment, pixels in a movement direction based on the reference point 3110, that is, upper pixels based on the reference point 3010, are moved to an opposite side of the reference point. In this case, pixels forming a first boundary 3120 may be moved such that the pixels forming the first boundary 3120 are connected to a second boundary 3130 which is an opposite boundary connected to the first boundary. According to an embodiment, each of the first boundary 3120 and the second boundary 3130 may include a plurality of lines.

Figure 33:
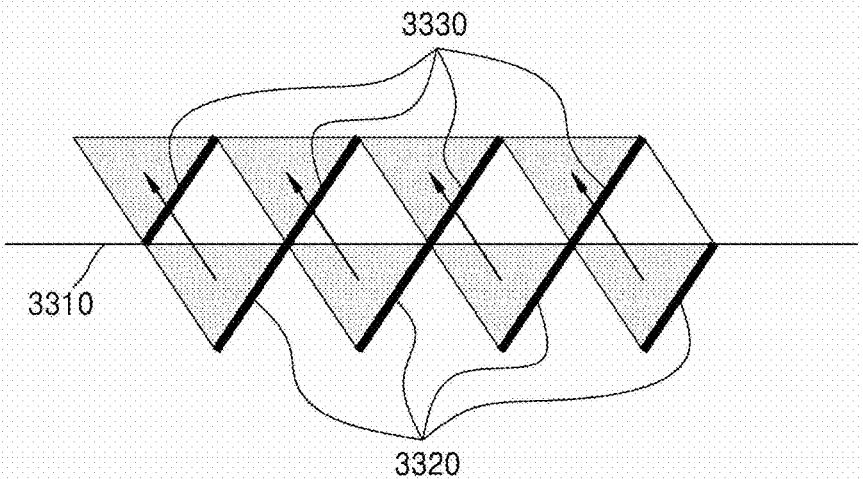
FIGS. 33 and 34 illustrate movement of pixels, according to another embodiment.
Figure 34:
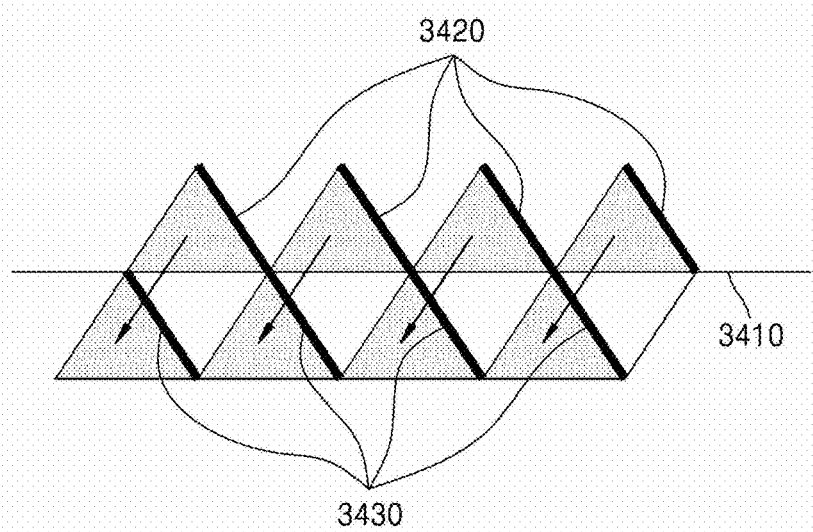

Referring to FIGS. 33 and 34, a point at ½ of a vertical length of a projection image may be set as a reference point 3310 or 3410. According to an embodiment, considering a movement direction of pixels, pixels in the movement direction based on the reference point are moved to an opposite side of the reference point. In this case, pixels forming a first boundary 3320 or 3420 may be moved such that the pixels forming the first boundary 3320 or 3420 are connected to a second boundary 3330 or 3430 which is an opposite boundary connected to the first boundary. According to an embodiment, each of the first boundary 3320 or 3420 and the second boundary 3330 or 3430 may include a plurality of lines.

After pixels in the projection image are moved in operations 2810 to 2850, in operation 2860, the image processing apparatus generates a rectangular image by adding a marginal space. Operation 2860 is a process of reshaping the images shown in FIGS. 29(*b*) and 29(*d*) into images shown in FIGS. 29(*c*) and 29(*e*), respectively, or reshaping the images shown in FIGS. 32(*b*) and 32(*d*) into images shown in FIGS. 32(*c*) and 32(*e*), respectively. According to an embodiment, a rectangular image may be generated by moving the pixels in the projection image and then adding the marginal space.

Figure 35:
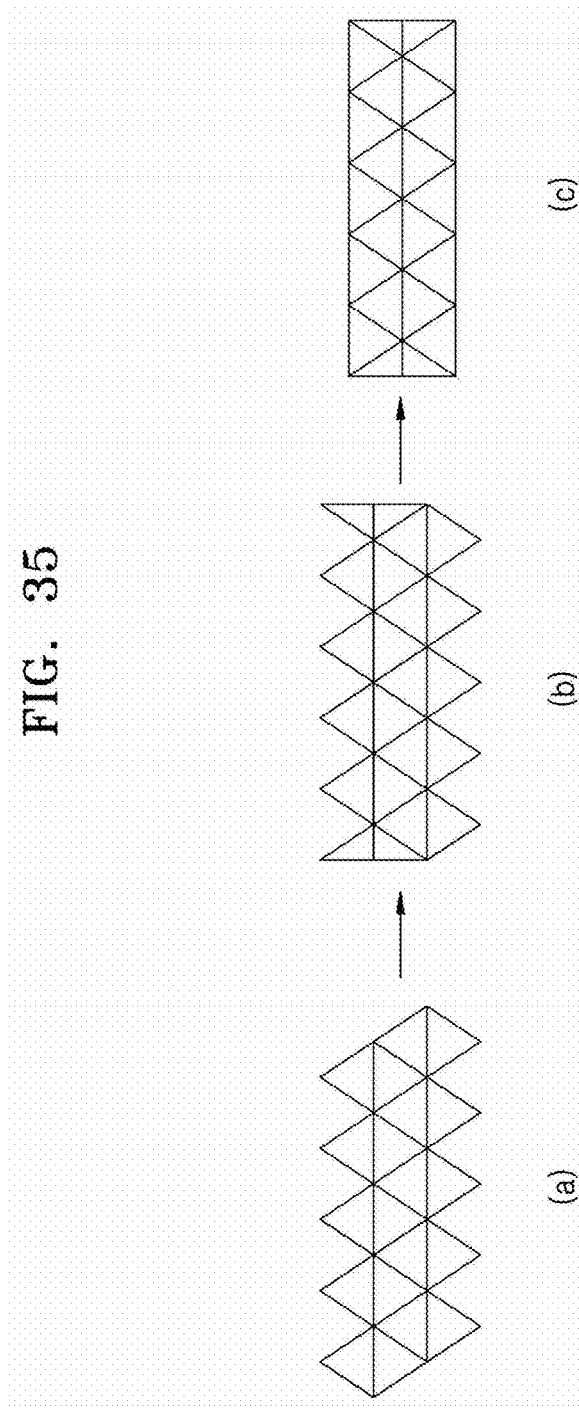
FIG. 35 illustrates a rectangular image reshaping method according to another embodiment.
Figure 37:
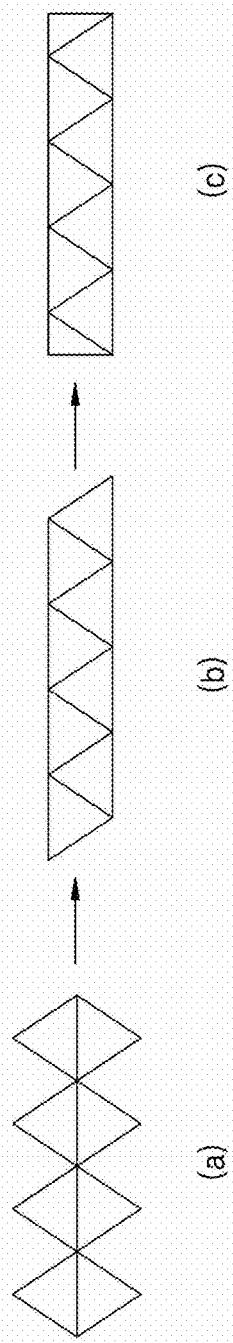
FIG. 37 illustrates a rectangular image reshaping method according to another embodiment.

FIGS. 35 and 37 illustrate a rectangular image reshaping method according to another embodiment.

According to an embodiment, setting a reference point and moving a plurality of pixels to an opposite side of the reference point may be repeated. A process of reshaping an image shown in FIG. 35(*a*) into an image shown in FIG. 35(*b*) is the same as the process of reshaping the image shown in FIG. 13(*a*) into an image shown in FIG. 13(*b*), and a process of reshaping an image shown in FIG. 37(*a*) into an image shown in FIG. 37(*b*) is the same as the process of reshaping the image shown in FIG. 32(*a*) into an image shown in FIG. 32(*b*), and thus a description of the processes is omitted. Processes of generating rectangular images shown in FIGS. 35(*c*) and 37(*c*) are described in more detail with reference to FIGS. 36 and 38.

Figure 36:
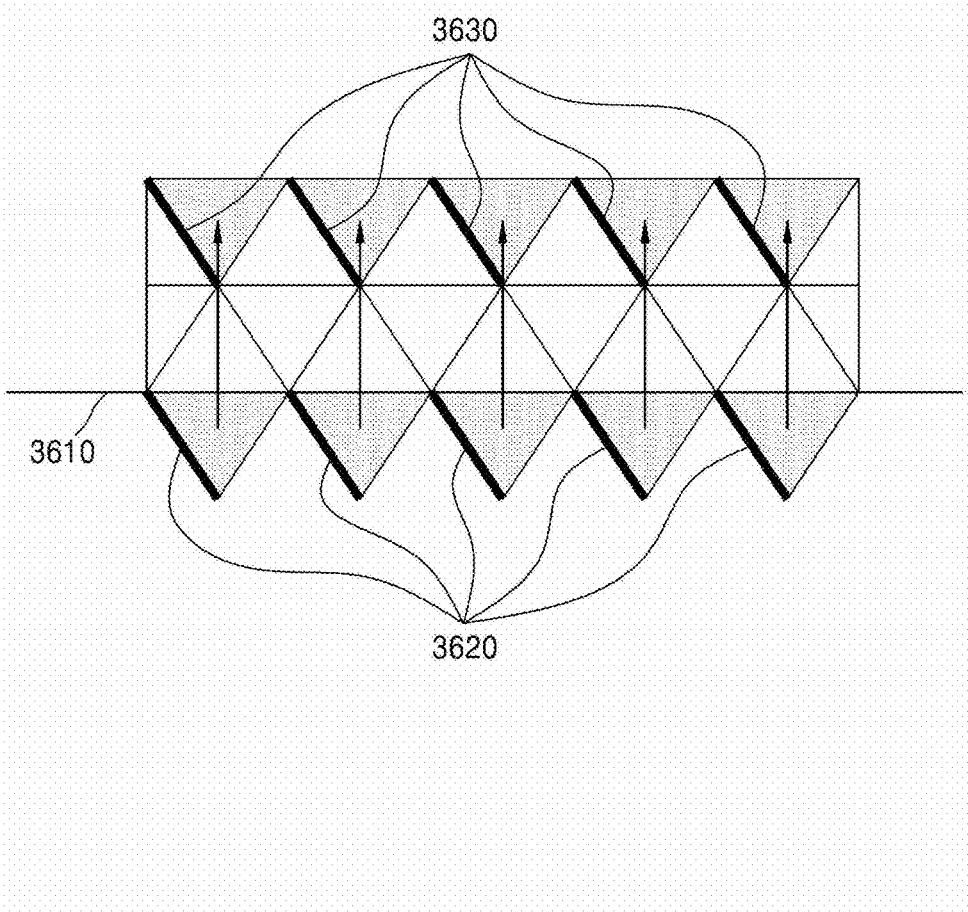
FIG. 36 illustrates movement of pixels, according to another embodiment.
Figure 38:
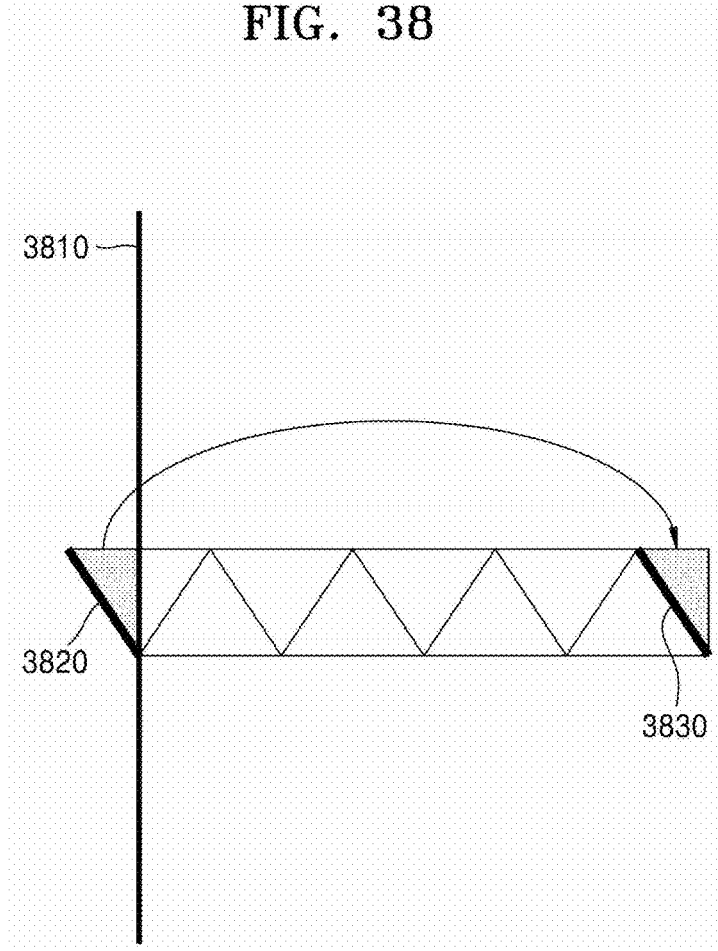
FIG. 38 illustrates movement of pixels, according to another embodiment.

FIGS. 36 and 38 illustrate movement of pixels, according to another embodiment.

Referring to FIG. 36, a point at ⅓ of a vertical length based on a bottom edge of a projection image may be set as a reference point 3610. According to an embodiment, pixels having a lower row number than a row number of the reference point are moved to an opposite side of the reference point. In this case, pixels forming a first boundary 3620 may be moved such that the pixels forming the first boundary 3620 are connected to a second boundary 3630 which is an opposite boundary connected to the first boundary. According to an embodiment, each of the first boundary 3620 and the second boundary 3630 may include a plurality of lines.

Referring to FIG. 38, a point at 1/10 of a horizontal length based on a left edge of a projection image may be set as a reference point 3810. According to an embodiment, pixels having a lower column number than a column number of the reference point are moved to an opposite side of the reference point. In this case, pixels forming a first boundary 3820 may be moved such that the pixels forming the first boundary 3820 are connected to a second boundary 3830 which is an opposite boundary connected to the first boundary.

Referring back to FIG. 2, according to an embodiment, in reshaping into a rectangular image, a plurality of reference lines may be set in a projection image, and pixels may be moved based on the plurality of reference lines. According to the embodiments shown in FIGS. 5 to 15, it has been described that pixels are moved such that the pixels are sequentially filled based on any one of a left edge, a right edge, a top edge, and a bottom edge as a reference line. According to an embodiment, unlike the embodiments shown in FIGS. 5 to 15, a plurality of reference lines may be set, and pixels may be moved such that the pixels are sequentially filled based on respective reference lines. This embodiment is described with reference to FIGS. 16 and 17.

Figure 16:
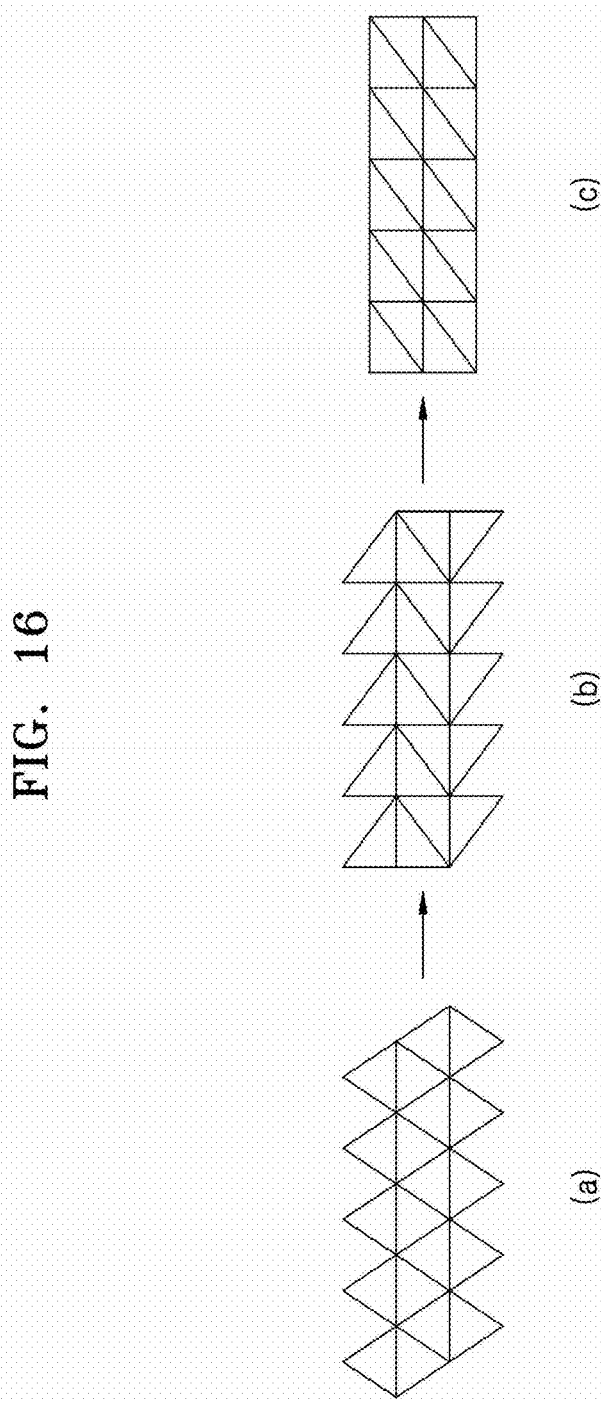
FIG. 16 illustrates a rectangular image reshaping method according to another embodiment.
Figure 17:
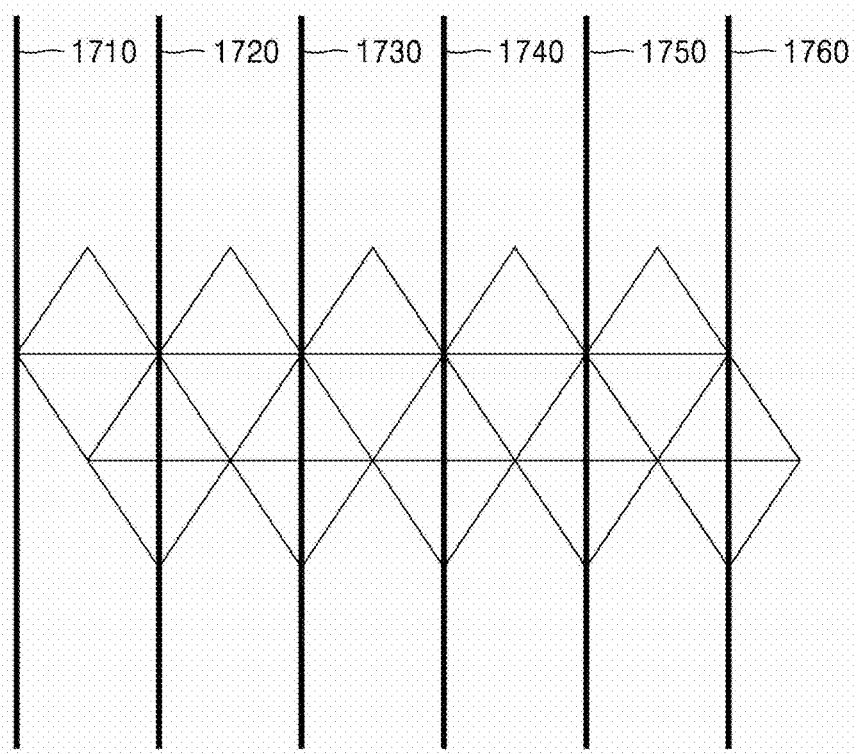
FIG. 17 illustrates a reference line setting operation according to another embodiment.

FIG. 16 illustrates a rectangular image reshaping method according to another embodiment, and FIG. 17 illustrates a reference line setting operation according to another embodiment.

First, comparing FIG. 16(*b*) to FIG. 6(*b*), a projection image 320 is reshaped through horizontal movement of pixels in the same manner, but a result thereof varies since, when pixels are horizontally moved in one direction, FIG. 6(*b*) shows that the pixels are moved based on one reference line, whereas FIG. 16(*b*) shows that the pixels are respectively moved based on a plurality of reference lines. Referring to FIG. 17, a plurality of reference lines 1710, 1720, 1730, 1740, 1750, and 1760 are set. According to an embodiment, in FIG. 17, pixels in upper two layers are moved to the left based on a left reference line of each triangle, and pixels in a lower one layer are moved by 1/10 of a total horizontal length and then moved to the right based on a right reference line of each triangle.

According to an embodiment, through the process described above, a projection image shown in FIG. 16(*c*) may be reshaped into an image shown in FIG. 16(*b*). A process of reshaping the image shown in FIG. 16(*b*) into a rectangular image shown in FIG. 16(*c*) is a process of vertically moving pixels, and thus, a description thereof is not repeated.

According to an embodiment, in reshaping into a rectangular image, the image processing apparatus may determine whether to move at least one pixel, and when it is determined to move the at least one pixel, the image processing apparatus may determine a movement direction of the at least one pixel. Not all pixels are always needed to be moved, and thus first whether to move a pixel is determined, and when it is determined to move the pixel, a movement direction of the pixel is determined. For example, in FIG. 7, a row including pixels having pixel data of E, F, G, H, I, N, O, P, Q, and R and a row including pixels having pixel data of S, T, U, V, W, b, k, l, m, n, o, and t do not have to be moved since the pixels are already filled sequentially from a left edge. In addition, in FIG. 9, a column including pixels having pixel data of A, B, E, S, X, and a and a column including pixels having pixel data of J, C, F, T, Y, and f do not have to be moved since the pixels are already filled sequentially from the top.

A pixel movement method according to an embodiment may be applied to various methods. For example, applying vertical movement after horizontal movement is also possible, and vertically moving pixels and then moving the pixels to an opposite side of a reference point is also possible.

According to an embodiment, by reshaping a projection image into a rectangular image, unnecessary data to be processed by the image processing apparatus may be reduced. In addition, adjacent pixels in the reshaped rectangular image have a high probability that the adjacent pixels have continuous pixel data, and thus, the adjacent pixels may be efficiently processed.

The particular rectangular image reshaping methods described above are only illustrative, and reshaping into a rectangular image may be performed by using various methods. For example, the above-described methods of moving locations of pixels may be used in combination to perform reshaping into a rectangular image. In addition, reshaping into a rectangular image may be performed through another method of moving locations of pixels.

Referring back to FIG. 2, in operation 240, the image processing apparatus processes the rectangular image. In operation 240, since the projection image has been reshaped into the rectangular image in operation 230, and thus, data to be processed may be reduced, and since adjacent pixels in the reshaped rectangular image have a high probability that the adjacent pixels have continuous pixel data, and thus, the rectangular image may be efficiently processed. According to an embodiment, a process of processing the rectangular image may include compression, rendering, and the like.

Although not shown in FIG. 2, according to an embodiment, the image processing method may further include generating restoration information required to restore the processed rectangular image into the projection image. According to an embodiment, the restoration information may include information related to a location movement history of pixels and/or original locations of the pixels. As described above, only when the location movement history of the pixels and/or the original locations of the pixels are obtained, the rectangular image may be easily restored into the projection image 410. In addition, according to an embodiment, the image processing method may further include transmitting the processed rectangular image and the restoration information. By transmitting both the processed rectangular image and the restoration information, a reception side thereof may easily restore the processed rectangular image into the projection image 410.

According to an embodiment, by reshaping a projection image into a rectangular image, data to be processed may be reduced, and adjacent pixels in the reshaped rectangular image have a high probability that the adjacent pixels have continuous pixel data, and thus, the rectangular image may be efficiently processed.

The image processing method according to an embodiment has been described. Hereinafter, an image processing apparatus for performing the image processing method according to an embodiment will be described with reference to FIG. 18.

Figure 18:
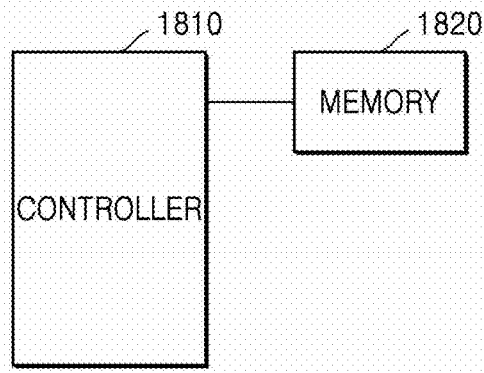
FIG. 18 is a flowchart of an image processing apparatus according to an embodiment.

FIG. 18 is a flowchart of an image processing apparatus according to an embodiment.

Referring to FIG. 18, an image processing apparatus 1800 may include a controller 1810 and a memory 1820. According to an embodiment, the image processing apparatus 1800 may be a VR device.

The controller 1810 controls a general operation of the image processing apparatus 1800 and may process an image by controlling the memory 1820. The controller 1810 may include random access memory (RAM) which stores a signal or data input from the outside of the image processing apparatus 1800 or is used as a storage region corresponding to various jobs to be performed by an electronic device, read only memory (ROM) which stores a control program for control of a peripheral device, and a processor. The processor may be implemented by a system on chip (SoC) in which a core and a graphics processing unit (GPU) are integrated. In addition, the process may include a plurality of processors.

According to an embodiment, the controller 1810 may acquire images captured in at least two directions, generate a projection image by projecting the images onto a polyhedron, move a location of at least one pixel among pixels in the projection image to reshape the projection image into a rectangular image, and process the rectangular image.

According to an embodiment, the controller 1810 may perform the image processing method which has been described with reference to FIGS. 2 to 17. Herein, repeated descriptions are given in brief.

According to an embodiment, to generate a projection image, the controller 1810 may project images onto a region of a development view corresponding to a region of a polyhedron when the images are projected onto the polyhedron. According to another embodiment, to generate a projection image, the controller 1810 may project the images, which have been projected onto the polyhedron, onto at least one plane outside the polyhedron.

According to an embodiment, to reshape the projection image 410 into a rectangular image, the controller 1810 may generate the rectangular image by moving only locations of pixels without removing pixels or adding new pixels. According to another embodiment, the controller 1810 may generate the rectangular image by moving pixels in the projection image and then adding at least one marginal space.

According to an embodiment, to reshape the projection image 410 into a rectangular image, the controller 1810 may determine a parallel movement direction of pixels included in each row for each row and horizontally move the pixels included in each row to the left or the right for each row such that the pixels are sequentially filled from a left edge or a right edge of each row according to the determined parallel movement direction. In addition, according to an embodiment, to reshape the projection image 410 into a rectangular image, the controller 1810 may determine a vertical movement direction of pixels included in each column for each column and vertically move the pixels included in each column upward or downward for each column such that the pixels are sequentially filled from a top edge or a bottom edge of each column according to the determined vertical movement direction.

According to an embodiment, in the reshaping into the rectangular image, the controller 1810 may move a plurality of pixels including pixels forming a first boundary of the projection image such that the pixels forming the first boundary are connected to a second boundary which is an opposite boundary connected to the first boundary.

According to an embodiment, in the reshaping into the rectangular image, the controller 1810 may set a plurality of reference lines in the projection image and move pixels based on the plurality of reference lines.

According to an embodiment, in the reshaping into the rectangular image, the controller 1810 may determine whether to move at least one pixel, and when it is determined to move the at least one pixel, the controller 1810 may determine a movement direction of the at least one pixel.

According to an embodiment, the controller 1810 may generate restoration information required to restore the rectangular image into the projection image.

According to an embodiment, the controller 1810 may control the processed rectangular image and the restoration information to be transmitted.

According to an embodiment, the controller 1810 may reduce unnecessary data to be processed by the image processing apparatus by reshaping the projection image into the rectangular image.

The memory 1820 stores a program and data required to operate the image processing apparatus 1800. The memory 1820 may include a volatile storage medium or a non-volatile storage medium or include a combination of both the storage media. The volatile storage medium may include a semiconductor memory such as RAM, dynamic RAM (DRAM), or static RAM (SRAM), and the non-volatile storage medium may include a hard disk or a flash NAND memory.

According to an embodiment, the memory 1820 may store data for an operation of the controller 1810.

Furthermore, although not shown in FIG. 18, the image processing apparatus 1800 may further include a camera unit, a receiver, a transmitter, and the like. According to an embodiment, the camera unit may photograph a peripheral environment surrounding the image processing apparatus by 360°. In addition, the receiver may receive a 360-degree image from an external device. According to an embodiment, the transmitter may transmit the processed rectangular image and the restoration information. The receiver and the transmitter may include a communication unit.

According to an embodiment, the image processing apparatus 1800 may process an image such that data to be processed is reduced and adjacent pixels have continuous pixel data, thereby reducing power consumption and increasing processing efficiency.

Figure 19:
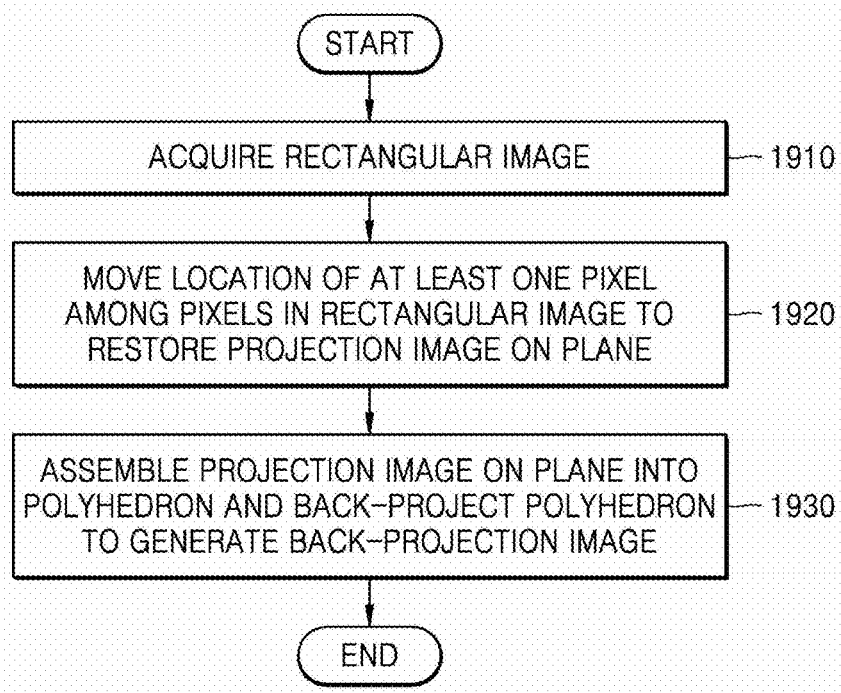
FIG. 19 is a flowchart of an image processing method according to another embodiment.

FIG. 19 is a flowchart of an image processing method according to another embodiment.

The image processing method according to another embodiment, which is shown in FIG. 19, is a method of restoring a processed rectangular image into the 360-degree image 310. Referring to FIG. 19, first, in operation 1910, an image processing apparatus acquires a rectangular image. According to an embodiment, the rectangular image may be an image generated by acquiring images 310 captured in at least two directions, projecting the images 310 onto a development view of the polyhedron 320 to generate the projection image 410, and moving a location of at least one pixel among pixels in the projection image 410 to reshape the projection image 410 into the rectangular image. That is, the rectangular image acquired in operation 1910 may be the image generated by the image processing method shown in FIGS. 2 to 17.

Thereafter, in operation 1920, the image processing apparatus moves a location of at least one pixel among pixels in the rectangular image to restore the projection image 410. According to an embodiment, a process of restoring the rectangular image into the projection image 410 may be performed in a reverse order of the process, shown in FIGS. 2 to 17, of reshaping the projection image 410 into a rectangular image.

Figure 20:
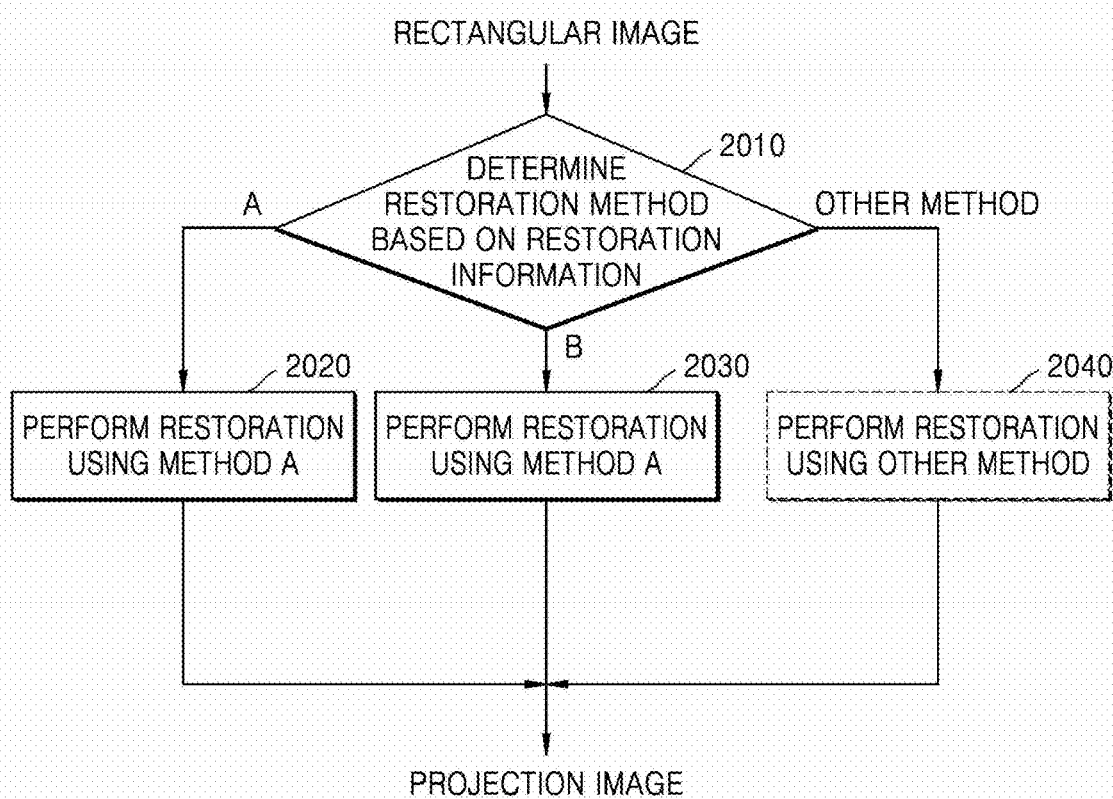
FIG. 20 is a flowchart of a process of selecting a projection image restoration method, according to an embodiment.

Although not shown in FIG. 19, the image processing method according to another embodiment may include receiving restoration information required to restore the rectangular image into the projection image 410, and in restoration of the projection image 410, the projection image 410 may be restored based on the received restoration information. That is, a restoration method may be determined based on the received restoration information. FIG. 20 shows a process of determining a restoration method based on the received restoration information.

FIG. 20 is a flowchart of a process of selecting a projection image restoration method, according to an embodiment.

Referring to FIG. 20, first, in operation 2010, the image processing apparatus determines a restoration method based on restoration information. According to an embodiment, in operation 2010, the image processing apparatus may determine one restoration method among at least one restoration method. When the image processing apparatus determines the restoration method as a method A in operation 2010, the image processing apparatus proceeds to operation 2020 to restore a projection image by using the method A, when the image processing apparatus determines the restoration method as a method B in operation 2010, the image processing apparatus proceeds to operation 2030 to restore a projection image by using the method B, and when the image processing apparatus determines the restoration method as another method in operation 2010, the image processing apparatus proceeds to operation 2040 to restore a projection image by using a corresponding method. Herein, the restoration methods A and B and other restoration method are identified for convenience to discriminate each restoration method and do not indicate specific restoration methods.

The restoration methods will be described through particular embodiments.

Figure 21:
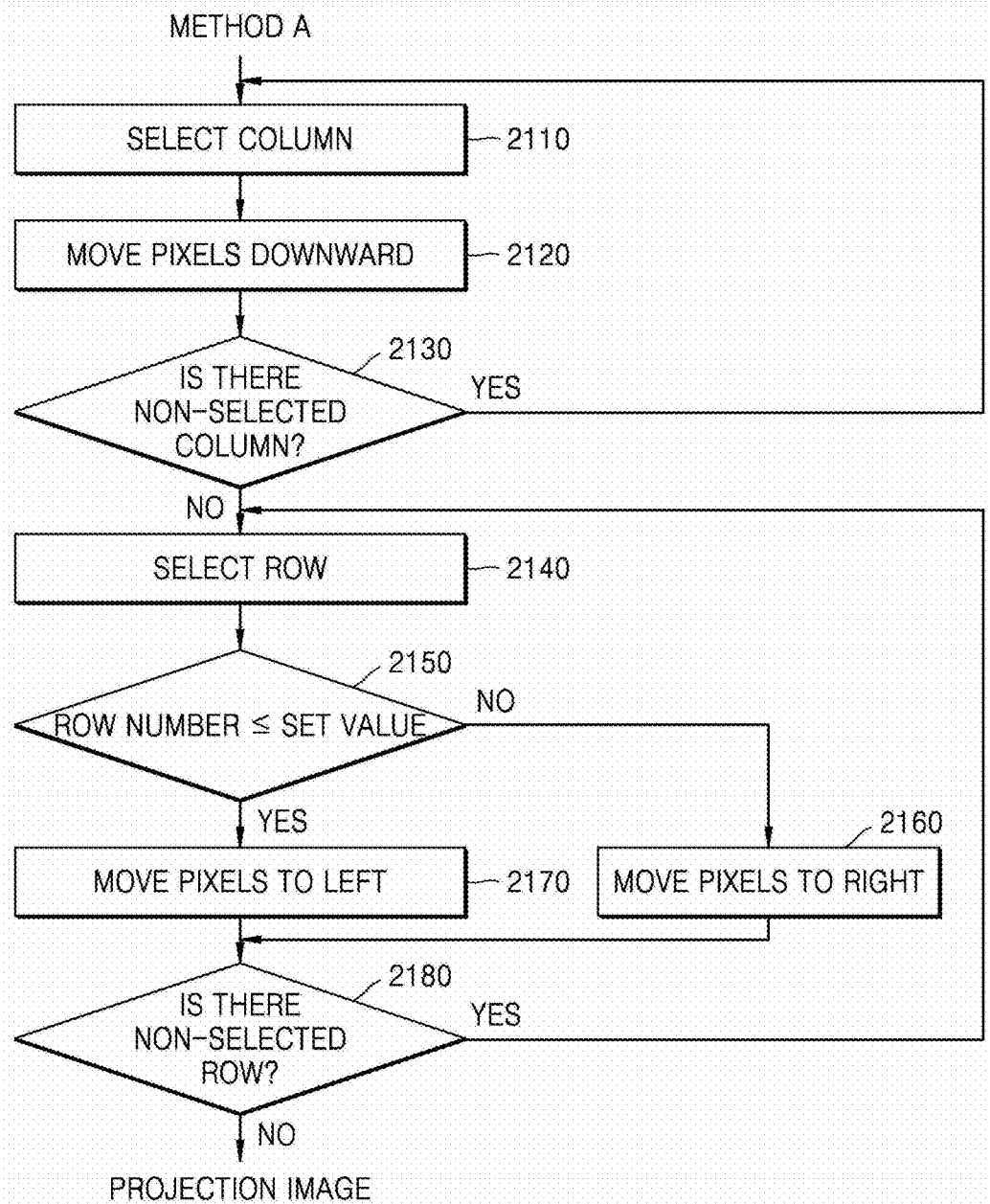
FIG. 21 is a flowchart of a projection image restoration method according to an embodiment.

FIG. 21 is a flowchart of a projection image restoration method according to an embodiment.

FIG. 21 shows a method of restoring a reshaped rectangular image into the projection image 410. A process of restoring the rectangular image into the projection image 410 is performed in a reverse order of a process of reshaping the projection image 410 into a rectangular image, and thus, the process of restoring the rectangular image into the projection image 410 will be described in brief.

First, in operation 2110, the image processing apparatus selects one column from a plane on which a rectangular image is shown.

Thereafter, in operation 2120, the image processing apparatus may move pixels in the selected column downward. In this case, the pixels in the selected column are moved to original locations thereof rather than moved to a bottom edge. This is a process of restoring the projection image 410, and thus this is a natural process for restoring an original image.

In operation 2130, the image processing apparatus determines whether there is a non-selected column, and when there is a non-selected column, the image processing apparatus proceeds back to operation 2110 to repeat the above-described process. Otherwise, when it is determined in operation 2130 that there is not a non-selected column, the image processing apparatus proceeds to operation 2140.

In operation 2140, the image processing apparatus selects one row on a plane on which the projection image 410 is shown.

Thereafter, in operation 2150, the image processing apparatus determines whether a number of the selected row is lower than or equal to a set value. When it is determined in operation 2150 that the number of the selected row is the set value or lower, the image processing apparatus may proceed to operation 2160 to move pixels included in the selected row to the right. Otherwise, when it is determined in operation 2150 that the number of the selected row is the set value or higher, the image processing apparatus may proceed to operation 2170 to move pixels included in the selected row to the left.

In operation 2180, the image processing apparatus determines whether there is a non-selected row, and when there is a non-selected row, the image processing apparatus proceeds back to operation 2140 to repeat the above-described process. Otherwise, when it is determined in operation 2180 that there is not a non-selected row, restoration of the projection image 410 is completed.

Figure 22:
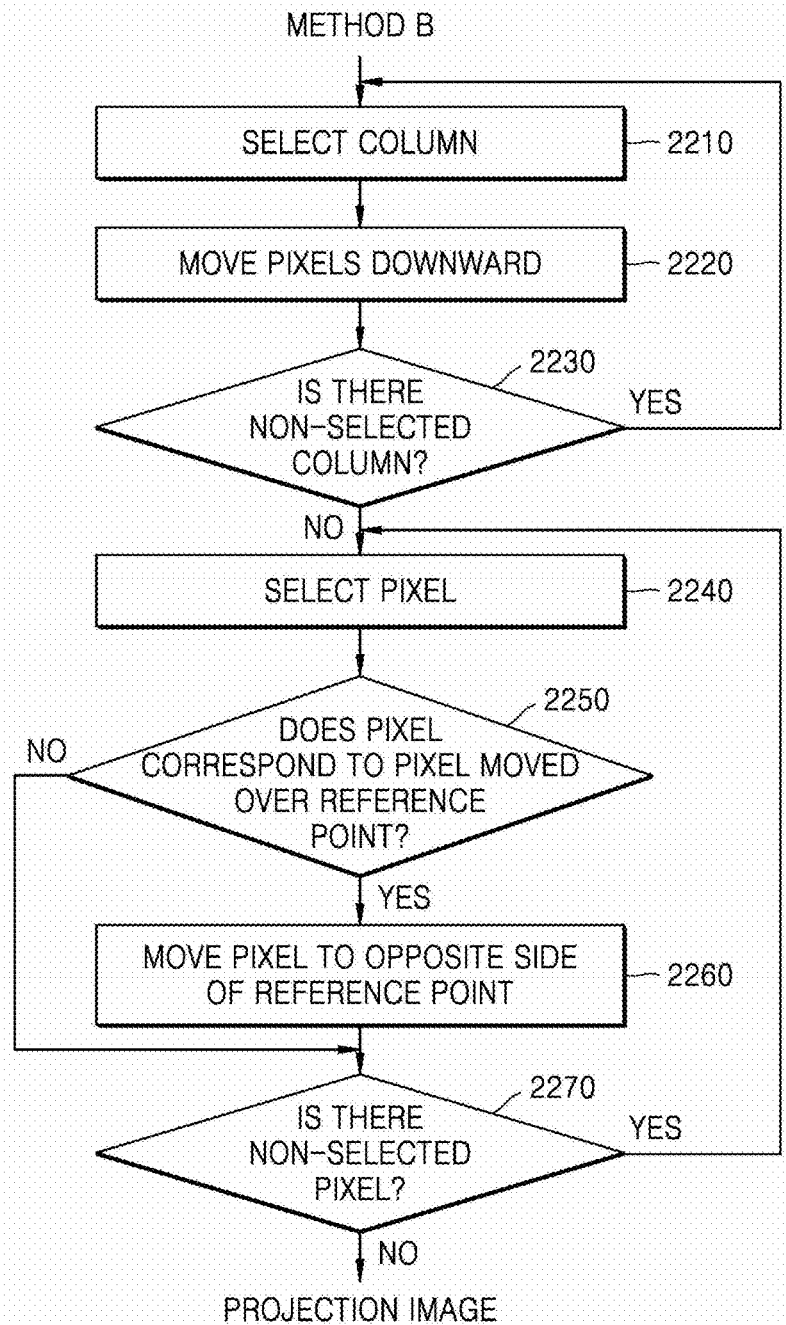
FIG. 22 is a flowchart of a projection image restoration method according to another embodiment.

FIG. 22 is a flowchart of a projection image restoration method according to another embodiment.

FIG. 22 shows a method of restoring a rectangular image reshaped using the method shown in FIG. 12 into a projection image. Operations 2210 to 2230 in FIG. 22 are the same as operations 2110 to 2130, and thus operations 2210 to 2230 will be described in brief.

First, in operation 2210, the image processing apparatus selects one column from a plane on which a rectangular image is shown. Thereafter, in operation 2220, the image processing apparatus may move pixels in the selected column downward. In operation 2230, the image processing apparatus determines whether there is a non-selected column, and when there is a non-selected column, the image processing apparatus proceeds back to operation 2210 to repeat the above-described process. Otherwise, when it is determined in operation 2230 that there is not a non-selected column, the image processing apparatus proceeds to operation 2240.

In operation 2240, the image processing apparatus selects a pixel.

In operation 2250, the image processing apparatus determines whether the selected pixel is a pixel moved over a reference point. When it is determined in operation 2250 that the selected pixel is a pixel moved over the reference point, the image processing apparatus proceeds to operation 2260 to move the pixel to an opposite side of the reference point. That is, the pixel is restored into an original location.

Otherwise, when it is determined in operation 2250 that the selected pixel is not a pixel moved over the reference point, the image processing apparatus directly proceeds to operation 2270.

In operation 2270, the image processing apparatus determines whether there is a non-selected pixel, and when there is a non-selected pixel, the image processing apparatus proceeds back to operation 2240 to repeat the above-described process. Otherwise, when it is determined in operation 2270 that there is not a pixel which is not selected by the image processing apparatus, restoration of the projection image is completed.

The methods of restoring a reshaped rectangular image into a projection image, according to embodiments, which have been described with reference to FIGS. 21 and 22, are only illustrative, and various restoration methods may be used according to rectangular image reshaping methods.

Referring back to FIG. 19, in operation 1930, the image processing apparatus restores the projection image into a polyhedron and back-projects the polyhedron to generate a back-projection image. In this case, the back-projection image may be an image indicating a peripheral environment surrounding a specific location. According to an embodiment, when the projection image is generated by projecting images onto a region of a development view corresponding to a region of the polyhedron when the images are projected onto the polyhedron, the projection image may be assembled to restore the polyhedron. According to another embodiment, when the projection image is generated by projecting images, which have been projected onto the polyhedron, onto at least one plane outside the polyhedron, the projection image may be stereoscopic to restore the polyhedron. According to an embodiment, the image processing apparatus may generate an image indicating all or a portion of the peripheral environment surrounding the specific location. For example, when the image processing apparatus is a VR device, and a user uses the VR device, a back-projection image of the user's peripheral environment may be generated according to a gaze of the user. In this case, the generated back-projection image may be an image indicating a portion of the user's peripheral environment viewed according to a gaze of the user rather than an image indicating all of the user's peripheral environment. According to an embodiment, the back-projection image may be an image indicating all of the user's peripheral environment. That is, the back-projection image may be a 360-degree image. The image processing apparatus may restore a projection image by using the rectangular image having small data in operation 1920, thereby performing efficient processing.

According to the image processing method according to another embodiment, when a back-projection image is generated based on a processed rectangular image, small data may be restored, thereby performing efficient processing with small power consumption.

Figure 23:
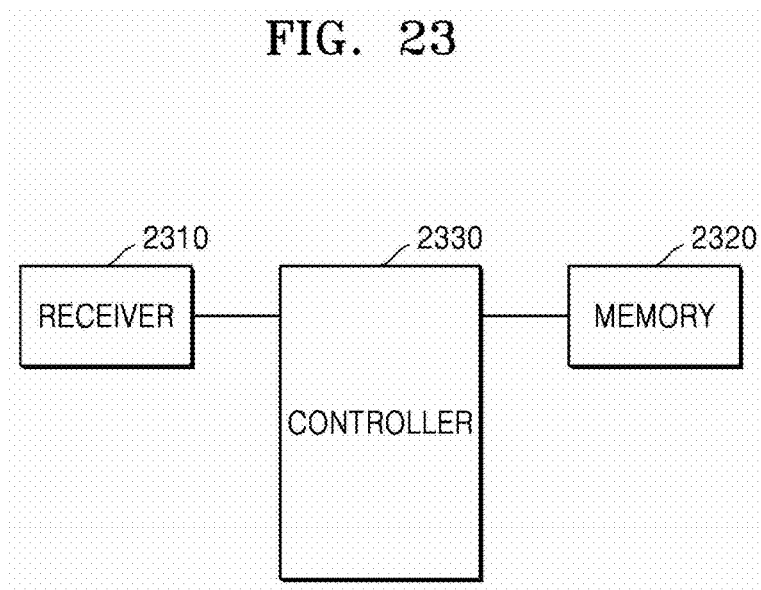
FIG. 23 is a flowchart of an image processing apparatus according to another embodiment.

FIG. 23 is a flowchart of an image processing apparatus according to another embodiment.

Referring to FIG. 23, an image processing apparatus 2300 may include a receiver 2310, a memory 2320, and a controller 2330. According to an embodiment, the image processing apparatus 2300 may be a VR device. In addition, the image processing apparatus 2300 may be the same as the image processing apparatus 1800 shown in FIG. 18.

The receiver 2310 receives a rectangular image. In this case, the received rectangular image may be an image-processed rectangular image. The receiver 2310 may include various components such as a universal serial bus (USB) interface unit and a digital versatile disc (DVD) interface unit. For example, when the receiver 2310 includes a USB interface unit, the image processing apparatus 2300 may receive an image file from a USB. Furthermore, when an image is received from an external device through a communication unit (not shown), the communication unit may act as the receiver 2310. In this case, the communication unit may be connected to a network in a wired or wireless manner to communicate with the external device and may include a near-field communication (NFC) module, a mobile communication module, a wireless Internet module, a wired Internet module, and the like. In addition, the communication unit may include one or more components.

The memory 2320 stores a program and data required to operate the image processing apparatus 2300. The memory 2320 may include a volatile storage medium or a non-volatile storage medium or include a combination of both the storage media. The volatile storage medium may include a semiconductor memory such as RAM, DRAM, or SRAM, and the non-volatile storage medium may include a hard disk or a flash NAND memory.

According to an embodiment, the memory 2320 may store data for an operation of the controller 2330.

The controller 2330 controls a general operation of the image processing apparatus 2300 and may process an image by controlling the memory 2320. The controller 2330 may include RAM which stores a signal or data input from the outside of the image processing apparatus 2300 or is used as a storage region corresponding to various jobs to be performed by an electronic device, ROM which stores a control program for control of a peripheral device, and a processor. The processor may be implemented by an SoC in which a core and a GPU are integrated. In addition, the processor may include a plurality of processors.

According to an embodiment, the controller 2330 may acquire a rectangular image, move a location of at least one pixel among pixels in the rectangular image to restore a projection image, restore the projection image into a polyhedron, and back-project the polyhedron to generate a back-projection image. According to an embodiment, the rectangular image may be an image generated by acquiring images 310 captured in at least two directions, projecting the images 310 onto a development view of the polyhedron 320 to generate the projection image 410, and moving a location of at least one pixel among pixels in the projection image to reshape the projection image 410 into the rectangular image. That is, the rectangular image acquired in operation 1910 may be the image generated by the image processing method shown in FIGS. 2 to 17. According to an embodiment, when the projection image is generated by projecting images onto a region of a development view corresponding to a region of the polyhedron when the images are projected onto the polyhedron, the projection image may be assembled to restore the polyhedron. According to another embodiment, when the projection image is generated by projecting images, which have been projected onto the polyhedron, onto at least one plane outside the polyhedron, the projection image may be stereoscopic to restore the polyhedron.

According to an embodiment, the controller 2330 may perform the image processing method described with reference to FIGS. 19 to 22. Herein, repeated descriptions are given in brief.

According to an embodiment, the controller 2330 may control the receiver 2310 such that the receiver 2310 receives restoration information required to restore a rectangular image into a projection image and restore the projection image based on the received restoration information when the projection image is restored.

According to another embodiment, the image processing apparatus 2300 restores small data when a back-projection image is generated, based on a rectangular image, and thus, the image processing apparatus 2300 may perform efficient processing with small power consumption.

An image processing process has been described with an example in which the acquired image 310 is projected onto a regular icosahedron. However, as described above, the polyhedron 320 is not limited to a regular icosahedron, and image processing may be performed by projecting the acquired image 310 onto various shapes of polyhedrons 320. FIG. 24 shows projection images generated using the various shapes of polyhedrons 320.

FIG. 24 illustrates projection images according to an embodiment.

FIG. 24(*a*) shows a projection image which may be generated by projecting the acquired image 310 onto a regular octahedron, FIGS. 24(*b*) and 24(*c*) show projection images which may be generated by projecting the acquired image 310 onto a regular hexahedron, and FIG. 24(*d*) shows a projection image which may be generated by projecting the acquired image 310 onto a regular octadecahedron. Referring to FIG. 24, these polyhedrons may include at least one triangle having the same shape and area. In this case, one face of the polyhedrons may include a different polygon made with two or more triangles. For example, FIG. 24(c) illustrates a regular hexahedron including faces, each face being a quadrangle made with two triangles.

According to an embodiment, a projection image may be generated by using various shapes of polyhedrons which are not limited to the polyhedrons shown in FIG. 24.

The embodiments described above can be written as computer-executable programs and can be implemented in general-use digital computers that execute the programs using a computer-readable recording medium.

Examples of the computer-readable recording medium include storage media such as magnetic storage media (e.g., ROM, floppy disks, hard disks, etc.), optical recording media (e.g., CD-ROMs, or DVDs), and carrier waves (transmission over the Internet).

While embodiments have been described with reference to the accompanying drawings, it will be understood by those of ordinary skill in the art that various changes in form and details may be made therein without changing the technical spirit and mandatory features of the disclosure. Therefore, the embodiments should be understood in the illustrative sense only and not for the purpose of limitation in all aspects.

The invention claimed is:

1. An image processing method comprising:
acquiring images captured in at least two directions;
generating a projection image by projecting the images onto a polyhedron;
moving a location of at least one pixel among pixels in the projection image to reshape the projection image into a rectangular image; and
processing the rectangular image,
wherein the moving of the location of the at least one pixel among the pixels in the projection image to reshape the projection image into the rectangular image comprises:
determining a horizontal movement direction of pixels included in each row for each row based on a set value;
horizontally moving the pixels included in each row to a left or a right for each row such that the pixels are sequentially filled from a left edge or a right edge of each row according to the determined horizontal movement direction;
vertically moving the pixels included in each column upward for each column such that the pixels are sequentially filled from a top edge of each column;
wherein based on a number of each row being the set value or lower, it is determined that the horizontal movement direction is the left, and
wherein based on the number of each being higher than the set value, it is determined the horizontal movement direction is the right.

2. The image processing method of claim 1, wherein the generating of the projection image by projecting the images onto the polyhedron comprises projecting the images onto a region of a development view corresponding to a region of the polyhedron when the images are projected onto the polyhedron.

3. The image processing method of claim 1, further comprising generating restoration information required to restore the rectangular image into the projection image.

4. The image processing method of claim 1, wherein the polyhedron is a polyhedron including at least two triangles having the same shape and area.

5. An image processing method comprising:
acquiring a rectangular image;
moving a location of at least one pixel among pixels in the rectangular image to restore a projection image; and
restoring the projection image into a polyhedron and back-projecting the polyhedron to generate a back-projection image,
wherein the rectangular image is generated by acquiring images captured in at least two directions, projecting the images onto a polyhedron to generate a projection image, and moving a location of at least one pixel among pixels in the projection image to reshape the projection image into the rectangular image,
wherein the moving of the location of the at least one pixel among the pixels in the projection image to reshape the projection image into the rectangular image comprises:
determining a horizontal movement direction of pixels included in each row for each row based on a set value;
horizontally moving the pixels included in each row to a left or a right for each row such that the pixels are sequentially filled from a left edge or a right edge of each row according to the determined horizontal movement direction;
vertically moving the pixels included in each column upward for each column such that the pixels are sequentially filled from a top edge of each column;
wherein based on a number of each row being the set value or lower, it is determined that the horizontal movement direction is the left, and
wherein based on the number of each being higher than the set value, it is determined the horizontal movement direction is the right.

6. The image processing method of claim 5, further comprising receiving restoration information required to restore the rectangular image into the projection image,
wherein the restoring of the projection image comprises restoring the projection image based on the received restoration information.

7. An image processing apparatus comprising:
a controller configured to acquire images captured in at least two directions, generate a projection image by projecting the images onto a polyhedron, move a location of at least one pixel among pixels in the projection image to reshape a rectangular image, and process the rectangular image; and
a memory which stores data for an operation of the controller,
wherein the moving of the location of the at least one pixel among the pixels in the projection image to reshape the projection image into the rectangular image comprises:
determining a horizontal movement direction of pixels included in each row for each row based on a set value;
horizontally moving the pixels included in each row to a left or a right for each row such that the pixels are sequentially filled from a left edge or a right edge of each row according to the determined horizontal movement direction;
vertically moving the pixels included in each column upward for each column such that the pixels are sequentially filled from a top edge of each column;

wherein based on a number of each row being the set value or lower, it is determined that the horizontal movement direction is the left, and wherein based on the number of each being higher than the set value, it is determined the horizontal movement direction is the right.

\* \* \* \* \*